US009454812B2

(12) United States Patent
Honeck et al.

(10) Patent No.: US 9,454,812 B2
(45) Date of Patent: Sep. 27, 2016

(54) REMOTE APPROVAL OF PRINT

(71) Applicant: Quad/Tech, Inc., Sussex, WI (US)

(72) Inventors: Rick C. Honeck, West Bend, WI (US);
Adam Nelson, Woodstock, IL (US);
Stephen J. Daily, Brookfiled, WI (US);
Jon Ubert, Waukesha, WI (US); John C. Seymour, Milwaukee, WI (US);
Michael D. Sisco, Waukesha, WI (US)

(73) Assignee: QUAD/TECH, INC., Sussex, WI (US)

( * ) Notice: Subject to any disclaimer, the term of this patent is extended or adjusted under 35 U.S.C. 154(b) by 0 days.

(21) Appl. No.: 14/707,987

(22) Filed: May 8, 2015

(65) Prior Publication Data

US 2015/0243021 A1    Aug. 27, 2015

Related U.S. Application Data

(63) Continuation of application No. 13/860,454, filed on Apr. 10, 2013, now Pat. No. 9,047,520, which is a continuation of application No. 13/475,776, filed on May 18, 2012, now Pat. No. 8,437,041, which is a (Continued)

(51) Int. Cl.
*G06T 7/00* (2006.01)
*B41F 31/04* (2006.01)
*B41F 33/00* (2006.01)

(Continued)

(52) U.S. Cl.
CPC .......... *G06T 7/0004* (2013.01); *B41F 31/045* (2013.01); *B41F 33/0045* (2013.01); *G06K 9/036* (2013.01); *H04N 1/00278* (2013.01); *H04N 1/56* (2013.01);

(Continued)

(58) Field of Classification Search
CPC ....... B41F 33/0036; G01J 3/46; G01J 3/462; G03G 15/553; G03G 15/556
USPC .......................... 358/1.9, 515, 518, 524, 529
See application file for complete search history.

(56) References Cited

U.S. PATENT DOCUMENTS 3,330,393 A    7/1967 Heimlicher
3,930,447 A    1/1976 Murray (Continued)

FOREIGN PATENT DOCUMENTS

WO    WO-93/21548    10/1993

OTHER PUBLICATIONS

Notice of Allowance for U.S. Appl. No. 11/686,830, mail date Sep. 14, 2009, 6 pages.

(Continued)

*Primary Examiner* — Charlotte M Baker
(74) *Attorney, Agent, or Firm* — Foley & Lardner LLP

(57) ABSTRACT

Systems and methods for providing remote approval of an image for printing are provided. One system includes a processing circuit in communication with an image capturing device that is configured to capture an image of a printed product. The processing circuit is configured to process the captured image into a processed image accurate to within a tolerance in a color space to indicate the visual appearance of one or more colors. The color space is a standardized color space, such as sRGB or CIELAB. The processing circuit is further configured to transmit the processed image to a display located remote from the image capturing device and to receive an input signal from a remote input device to allow a user to approve or reject the displayed processed image for printing on a print device.

20 Claims, 23 Drawing Sheets

Related U.S. Application Data continuation of application No. 13/109,907, filed on May 17, 2011, now Pat. No. 8,194,283, which is a continuation of application No. 12/646,641, filed on Dec. 23, 2009, now Pat. No. 7,969,613, which is a continuation of application No. 11/686,830, filed on Mar. 15, 2007, now Pat. No. 7,652,792.

(60) Provisional application No. 60/782,794, filed on Mar. 15, 2006.

(51) Int. Cl.
  *G06K 9/03* (2006.01)
  *H04N 1/00* (2006.01)
  *H04N 1/56* (2006.01)

(52) U.S. Cl.
  CPC .......... *G06T 2207/10004* (2013.01); *G06T 2207/10024* (2013.01); *G06T 2207/30144* (2013.01)

(56) References Cited

U.S. PATENT DOCUMENTS

| | | |
|---|---|---|
| 4,008,664 A | 2/1977 | Crum et al. |
| 4,200,932 A | 4/1980 | Schramm et al. |
| 4,268,119 A | 5/1981 | Hartmann |
| 4,329,050 A | 5/1982 | Olsen |
| 4,639,776 A | 1/1987 | Foerster et al. |
| 4,852,485 A | 8/1989 | Brunner |
| 4,955,290 A | 9/1990 | Kipphan et al. |
| 4,977,832 A | 12/1990 | Walter |
| 4,979,032 A | 12/1990 | Alessi et al. |
| 5,043,904 A | 8/1991 | Sikes et al. |
| 5,060,572 A | 10/1991 | Waizmann |
| 5,163,012 A | 11/1992 | Wuhrl et al. |
| 5,182,721 A | 1/1993 | Kipphan et al. |
| 5,305,082 A | 4/1994 | Bret |
| 5,305,392 A | 4/1994 | Longest, Jr. |
| 5,309,257 A | 5/1994 | Bonino et al. |
| 5,333,069 A | 7/1994 | Spence |
| 5,412,577 A | 5/1995 | Sainio et al. |
| 5,689,425 A | 11/1997 | Sainio et al. |
| 5,724,259 A | 3/1998 | Seymour et al. |
| 5,724,437 A | 3/1998 | Bucher et al. |
| 5,754,222 A | 5/1998 | Daly et al. |
| 5,857,063 A | 1/1999 | Poe et al. |
| 5,957,049 A | 9/1999 | Ammeter et al. |
| 5,967,050 A | 10/1999 | Seymour |
| 6,355,931 B1 | 3/2002 | Hernandez et al. |
| 6,381,343 B1 | 4/2002 | Davis et al. |
| 6,412,412 B1 | 7/2002 | Michaud et al. |
| 6,499,402 B1 | 12/2002 | Sikes et al. |
| 6,588,336 B2 | 7/2003 | Kaiser |
| 6,646,757 B1 | 11/2003 | Silverbrook |
| 6,707,931 B2 | 3/2004 | Herbert |
| 6,748,860 B2 | 6/2004 | Loffler et al. |
| 6,775,633 B2 | 8/2004 | Edge |
| 6,874,420 B2 | 4/2005 | Lewis et al. |
| 6,937,249 B2 | 8/2005 | Herbert et al. |
| 7,009,723 B1 | 3/2006 | Bartholet et al. |
| 7,017,492 B2 | 3/2006 | Seymour |
| 7,075,552 B2 | 7/2006 | Herbert et al. |
| 7,187,472 B2 | 3/2007 | Friedman et al. |
| 7,297,969 B1 | 11/2007 | Wolinsky et al. |
| 7,307,755 B2 * | 12/2007 | Delang .............. B41F 33/0036 358/1.9 |
| 7,652,792 B2 | 1/2010 | Honeck et al. |
| 7,969,613 B2 | 6/2011 | Honeck et al. |
| 2003/0125892 A1 | 7/2003 | Edge |
| 2004/0000241 A1 | 1/2004 | Kiyohara |
| 2004/0008358 A1 | 1/2004 | Kiyohara |
| 2004/0177783 A1 | 9/2004 | Seymour |
| 2004/0213433 A1 | 10/2004 | Noffke et al. |
| 2005/0036163 A1 | 2/2005 | Edge |
| 2005/0099795 A1 | 5/2005 | Seymour |
| 2005/0226466 A1 | 10/2005 | Seymour |
| 2006/0027768 A1 | 2/2006 | Pearson et al. |
| 2006/0078167 A1 | 4/2006 | Heikkila et al. |
| 2007/0019216 A1 | 1/2007 | Chodagiri et al. |
| 2007/0058021 A1 | 3/2007 | Kusunoki |
| 2007/0139679 A1 | 6/2007 | Fejfar |
| 2007/0216918 A1 | 9/2007 | Honeck et al. |

OTHER PUBLICATIONS

Notice of Allowance for U.S. Appl. No. 12/646,641, mail date Feb. 18, 2011, 7 pages.
Notice of Allowance for U.S. Appl. No. 13/109,907, mail date Feb. 7, 2012, 7 pages.
Notice of Allowance for U.S. Appl. No. 13/475,776, mail date Jan. 22, 2013, 4 pages.
Notice of Allowance for U.S. Appl. No. 13/475,776, mail date Jan. 7, 2013, 7 pages.
Notice of Allowance for U.S. Appl. No. 13/860,454, mail date Jan. 26, 2015, 8 pages.
Office Action for U.S. Appl. No. 11/686,830, mail date May 15, 2009, 31 pages.
Office Action for U.S. Appl. No. 12/646,641, mail date Oct. 13, 2010, 4 pages.
Office Action for U.S. Appl. No. 13/109,907, mail date Sep. 21, 2011, 10 pages.
Office Action for U.S. Appl. No. 13/475,776, mail date Sep. 13, 2012, 7 pages.
Office Action for U.S. Appl. No. 13/860,454, mail date Sep. 23, 2015, 9 pages.

* cited by examiner

REMOTE APPROVAL OF PRINT

RELATED APPLICATION DATA

The present application is a continuation of U.S. application Ser. No. 13/860,454, filed Apr. 10, 2013, which is a continuation of U.S. application Ser. No. 13/475,776, filed May 18, 2012, which is a continuation of U.S. application Ser. No. 13/109,907 (now U.S. Pat. No. 8,194,283), filed May 17, 2011, which is a continuation of U.S. application Ser. No. 12/646,641 (now U.S. Pat. No. 7,969,613), filed Dec. 23, 2009, which is a continuation of U.S. application Ser. No. 11/686,830 (now U.S. Pat. No. 7,652,792), filed Mar. 15, 2007, which claims benefit of U.S. Provisional Application No. 60/782,794, filed Mar. 15, 2006, all of which are incorporated herein by reference in their entireties.

BACKGROUND

Large scale printing operations employ various types of print devices (e.g., web offset, rotogravure, flexographic, digital printing, inkjet, etc.) with each having its own advantages and drawbacks. However, one problem common to most print devices 205 is the problem of producing color images that match a desired color image. Variations in the make-up of the ink, the quantity of ink used, the environment within the printing facility, the settings or wear of the print device 205, etc. all can affect the actual color of the printed product 206. In order to produce printed product of the color desired, printers often go through a two-step proofing process.

In the first proofing process, an image (e.g., an image from a digital camera or a photograph) is provided to a printer for reproduction. The printer then produces a color image on a proofing device that is within the color space of the printing equipment to be used to print the printed product 206. This produced color image is referred to as a proof. The proof is then sent to the print buyer for approval. Once approved, the printer adjusts the print device 205 that will perform the printing operation in an effort to match the approved proof. The adjustment of the print device may include, for example, creating of digital image files based on a profile of the print device, and the manufacture of a printing plate or a rotogravure cylinder.

The second proofing step occurs when the print device 205 is ready to print the printed product 206. A sample 101 of the printed product is removed from the print device 205 and is placed on an ink desk 100 such as is illustrated for a web offset press in FIG. 1. The print buyer and the press operator review the sample 101 and make adjustments to the print device 205 based on the sample 101 of the printed product. In the example of FIG. 1, a plurality of ink keys 102 facilitate the adjustment. Each key controls ink flow to one vertical band or region of the printed product 206. This process is repeated until the print buyer is satisfied that the printed product 206 matches the proof. In some cases, this process has to be repeated when different batches of ink or print media are employed or when other factors that may affect the printed product 206 are varied, in addition to the beginning of a print run.

The time spent reviewing the printed product 206 and making adjustments to the print device 205 is time that the print device 205 cannot be used to produce usable printed product 206. As such, it is desirable to make the adjustment process go as quickly as possible to maximize the time that the print device 205 can be used for productive printing.

SUMMARY

According to one exemplary embodiment, a system includes an image capturing device configured to capture an image of a printed product on a printing press and a processing circuit in communication with the image capturing device. The processing circuit is configured to process the captured image into a processed image accurate to within a tolerance in a color space to indicate the visual appearance of one or more colors. The tolerance is not greater than 4 ΔE of a color on the printed product, and the color space is a sRGB or a CIELAB color space. The processing circuit is further configured to transmit the processed image to a display located remote from the image capturing device and to receive an input signal from a remote input device indicating whether a user has approved or rejected the displayed processed image for printing on the printing press.

According to another exemplary embodiment, a method includes receiving an image of a printed product on a printing press from an image capturing device and processing the captured image into a processed image accurate to within a tolerance in a color space to indicate the visual appearance of one or more colors. The tolerance is not great than 4 ΔE of a color on the printed product, and the color space is a sRGB or a CIELAB color space. The method further includes transmitting the processed image to a display located remote from the image capturing device and receiving an input signal from a remote input device indicating whether a user has approved or rejected the displayed processed image for printing on the printing press.

According to another exemplary embodiment, a system includes a processing circuit in communication with an image capturing device that is configured to capture an image of a printed product. The processing circuit is configured to process the captured image into a processed image accurate to within a tolerance in a color space to indicate the visual appearance of one or more colors. The color space is a standardized color space. The processing circuit is further configured to transmit the processed image to a display located remote from the image capturing device and to receive an input signal from a remote input device to allow a user to approve or reject the displayed processed image for printing on a print device.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Figure 3:
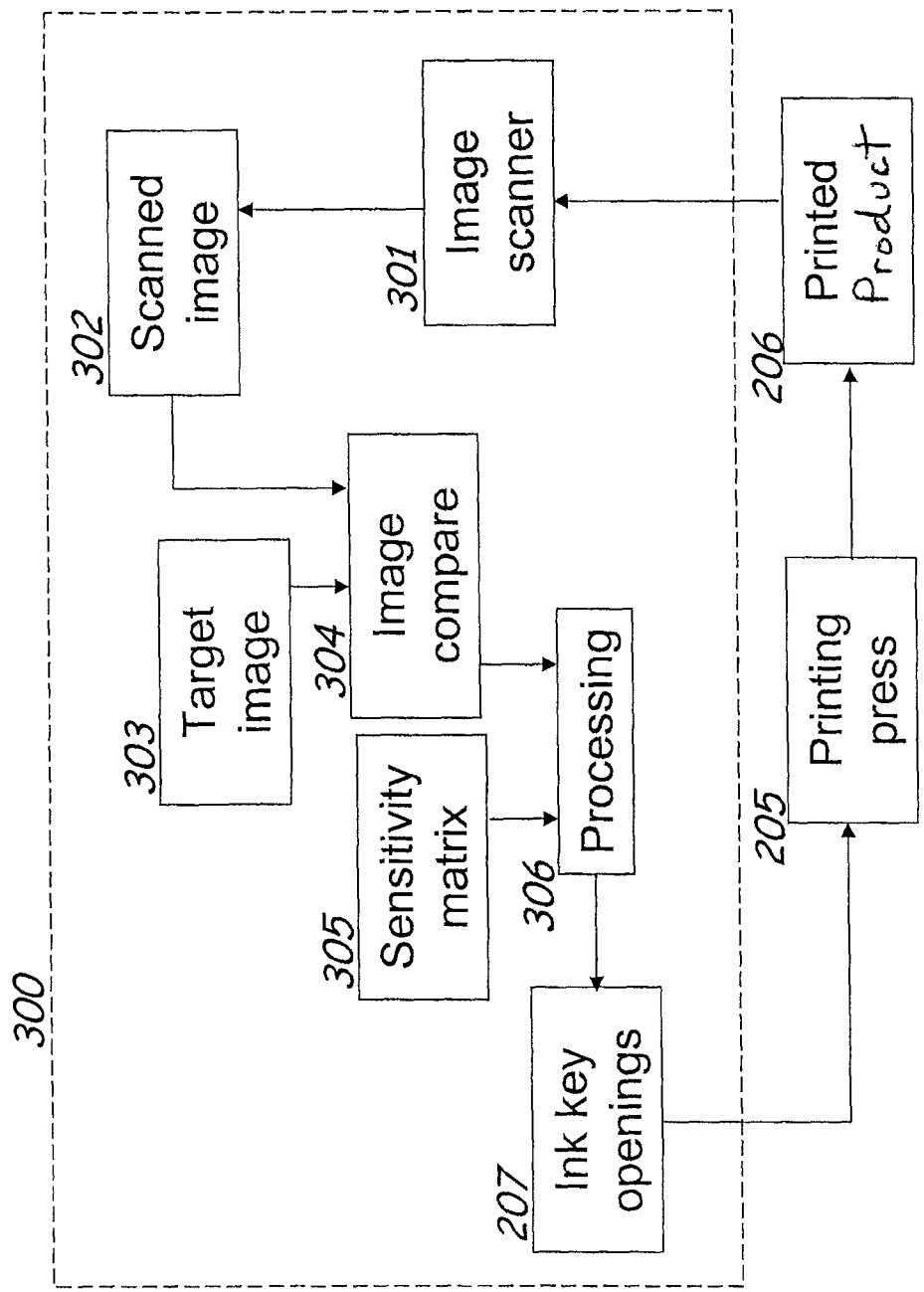
FIG. 3 is a prior art flow chart illustrating the operation of the color image control system of FIG. 2.
Figure 4:
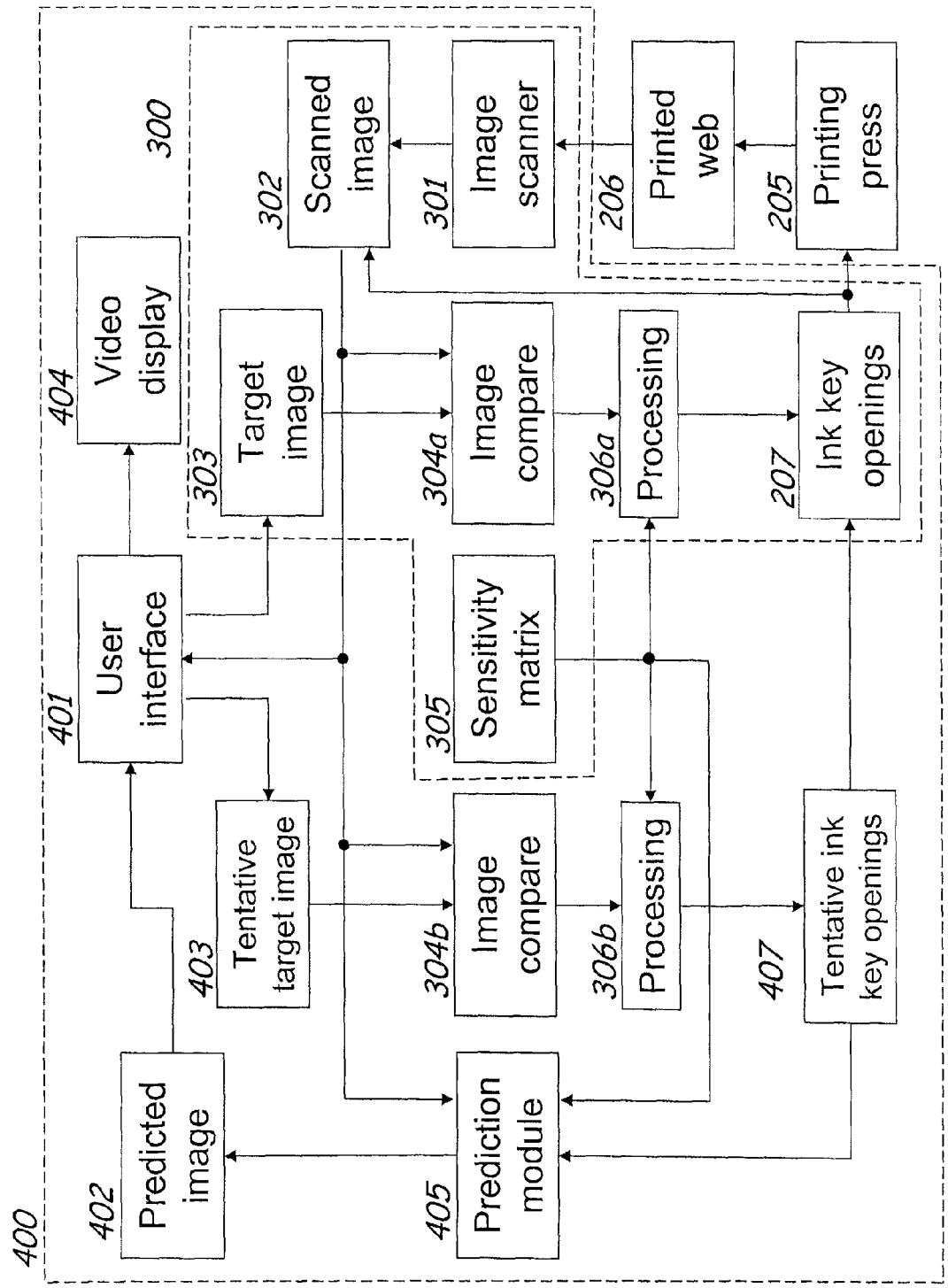
FIG. 4 is a flow chart illustrating operation of a print device including a color control system and a virtual ink desk embodying the invention.
Figure 12:
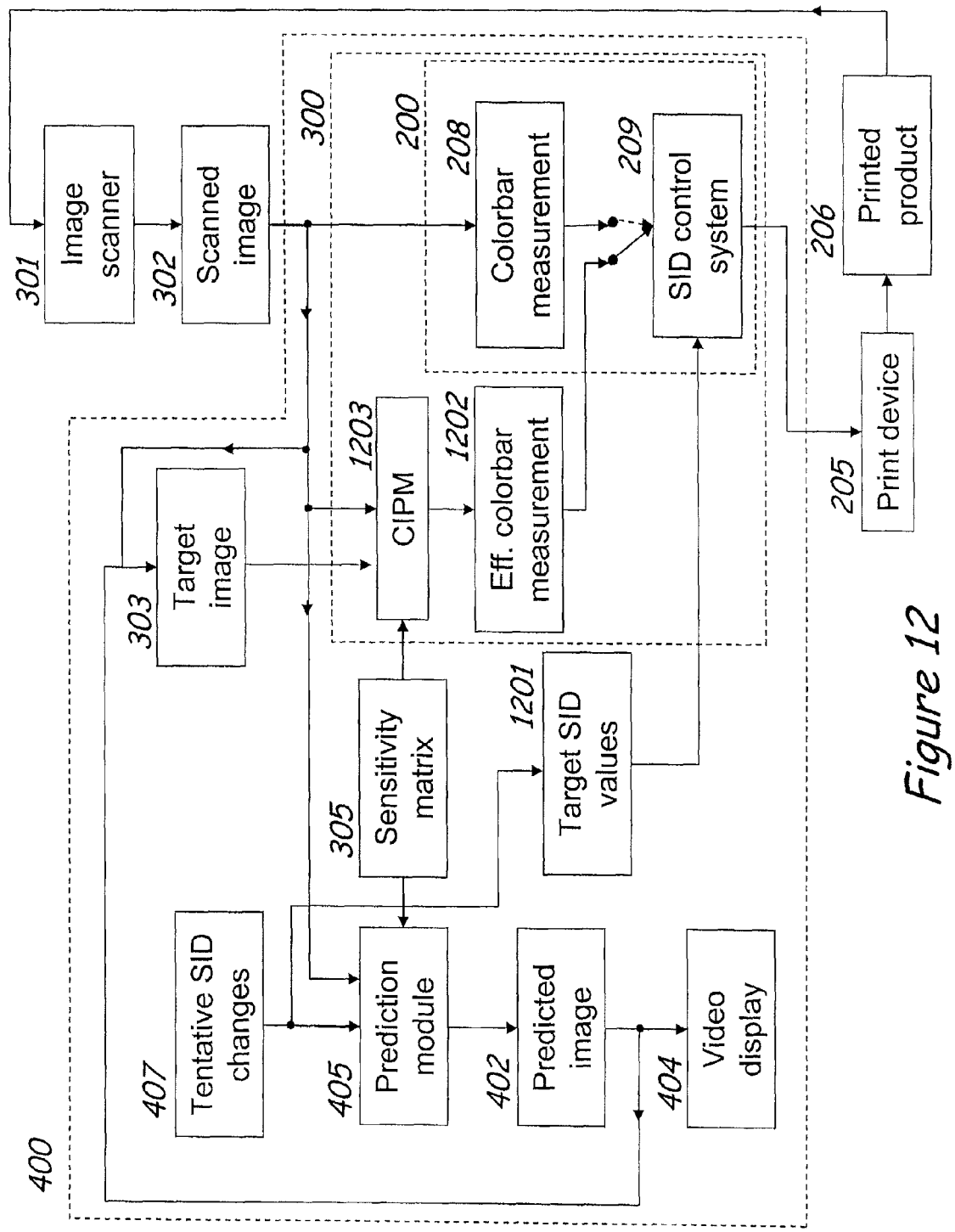
FIG. 12 is a flow chart illustrating operation of a print device including a color control system and a virtual ink desk embodying the invention.

In order to maintain the color of the printed product 206 at the desired levels, a color image control system 300 is often employed. Color image control systems 300 such as the one illustrated in FIG. 3, and employed in the constructions of FIGS. 4b and 12 are known. These systems use an image scanner 301 to capture an image 302 of the printed product 206. This image 302 is then compared to a target image 303 at block 304. In the construction of FIG. 3, the scanned image 302 is passed to an image compare module 304a. This module first aligns the scanned image 302 to the target image 303. The target image 303 is preferably derived from digital images used to create the printing plates, but may be derived from the printing plates themselves, or may be derived from a proof. Once color of the printed web has been deemed acceptable, a scanned image 302 or an adjusted image may become the target image 303.

Alignment is performed through correlation techniques that are well known. With the technique of correlation, the correspondence between pixels in the two images has been established so that pixel color values can be compared at substantially the same pixel locations of the target image 303 and the scanned image 302.

Alternate pattern matching techniques may be used to establish alignment between the images. Fiducial marks may be employed, as with register control systems commonly used on printing presses. Alternately, mechanical means may be used to ensure that the two images are in alignment. In this case, the comparison module 304a may not require an alignment step.

After alignment, comparison is made between the scanned image 302 and the target image 303. This comparison may, for example, be a subtraction of one set of color values from the other. The results of the comparison, desired color changes for each pixel, are then passed to a processing module 306, 306a which makes use of a sensitivity matrix 305 and regression techniques to determine the set of color adjustments that would bring the scanned image 302 into closest agreement with the target image 303.

The processing module 306 works in the following manner. For each pixel and each color channel (X, Y, and Z, or L*, a*, and b*, for example), the sensitivity matrix 305 provides an estimate of the amount of color change that would occur in the scanned image 302 if a unit change is made to one of the ink key openings 207. The sensitivity matrix has an entry for each combination of color channel, pixel in the image and ink key.

For a given 1.28 inch strip of the printed web 206, the scanned image may be 128 pixels wide by 6000 pixels tall. The color for this width may be directly controlled by three sets of ink keys, for example. Due to the spread of ink from a single ink key, there may be seven sets of ink keys that are taken into consideration. Each set of ink keys may include for example, cyan, magenta, yellow, black, as well as any custom inks A strip may be 128×6000 pixels. Thus, the number of sensitivity matrix entries for a strip is 3×4×128×6000 or ~9 million entries. A large printing plate may be 120"×60". At 100 DPI, the sensitivity matrix of a single surface of this size would be 864 million entries. As these entries would likely be stored using floating point numbers, we could expect the sensitivity matrix for this plate to use 3,296 megabytes of memory.

Given these entries in the sensitivity matrix 305, it is therefore possible to generate a set of linear equations relating changes in ink key openings to the desired color changes for each pixel. This set of linear equations can then be solved by regression techniques to determine the set of ink key openings 207 that best reaches the desired color changes. The resulting changes in ink key openings will then be combined with the ink key openings 207 that were being used when the scanned image 302 was printed.

Alternately, the set of equations may be nonlinear. The use of the word regression is not meant to imply a single algorithm for the minimization. Singular value decomposition, nonlinear regression, or Levenberg-Marquardt algorithms may be beneficially used.

For some print jobs, there are portions of the work that are more critical for color than others. Within a print job, the color accuracy of editorial content may be less critical than the color accuracy of an advertisement. Within a picture in an advertisement for example, there are degrees of criticality. The shade of the ground in a picture may for example be the least critical. Flesh tones and blue sky, being so-called memory colors, are generally more critical. The color of the product in the advertisement is typically the most critical in terms of color accuracy.

To accommodate the need for different levels of criticality, it is possible to use weighted linear regression so that areas of critical color have, in effect, a lower tolerance for color discrepancies.

The sensitivity matrix 305 is derived from the images used to produce the printing plates. The sensitivity matrix and the derivation thereof are described in detail in U.S. Pat. No. 5,967,050, which is fully incorporated herein by reference.

The processing module 306a hence generates a set of ink key openings 207 that will cause the printed web 206 to come closest to matching the target image 303. The printing press 205 will be commanded to move the ink keys to the desired ink key openings 207, and, after a suitable delay, a new scanned image 302 is collected and the process repeats. The delay is required to allow any inking changes to propagate through the printing press 205. A tuned PID loop may be used to reduce the required delay.

In the preferred embodiment, the color image control system 300 described in FIG. 3 may beneficially be used in conjunction with a colorbar control system 200, as is indicated in FIG. 12.

The virtual ink desk 400 will in this way perform the function of an image color control system 300 during the makeready phase, and also during the production phase. During the color OK phase, a traditional image color control system 300 is typically disabled so that the press operator can make changes. As will be seen, the virtual ink desk 400 has the advantage of being able to maintain control of color during the color OK phase.

FIG. 4b schematically illustrates a virtual ink desk 400 embodying the invention. The virtual ink desk 400 is shown and discussed herein in conjunction with a print device 205 and particularly with a web offset printing device. Of course, the virtual ink desk 400 described herein could be used with many different printing devices but is best suited for use with high-speed printing devices including but not limited to web off set presses, rotogravure, flexographic printing, sheetfed printing, high-speed digital printing systems, and the like. The virtual ink desk 400 is particularly advantageous with these high-speed print devices 205 as the virtual ink desk 400 can greatly reduce the make-ready period for a print job, thereby reducing wasted time as well as wasted resources (e.g., ink, print media, etc.).

The print device 205 receives a print media such as a web and discharges a printed product 206 that includes a printed image. In preferred constructions, the printed image is a color image. However, black and white or gray scale printing may also employ the virtual ink desk. As one of ordinary skill in the art will realize, a small portion of the print device 205 performs the actual printing operation with other interconnected portions performing additional operations such as drying the printed product 206, trimming, folding, aligning, stacking, and the like.

The print device 205 typically includes one or more adjustable ink control devices. These devices can be adjusted to vary the flow, quantity, pigment saturation, roller pressure or other ink parameters to allow for variation in the printed product. In color systems, at least one ink control device is provided for each color of ink employed (e.g., cyan, magenta, yellow, black, and custom colors). In most commercial systems, multiple regions or bands are defined with each band including one ink control device for each color.

For example, in a web offset printing system, a web passes through the various color print units in order for an image to be printed on the web. A plurality of ink keys act as the ink control devices. The keys can be adjusted to increase or decrease the quantity of a particular color of ink that is available to a particular region or band. However, as one of ordinary skill in the art will realize, adjusting one ink key in one region or band can affect the adjacent bands. In addition, adjusting an ink key to change the color of a portion of a band (e.g., the image of an automobile) will affect other regions within that band.

Generally, any print job includes at least three distinct phases. The first phase is the proofing phase. In this phase, the printer works to produce a printed image that matches an image that the print buyer wishes to have printed. Once an image is agreed upon, this image becomes the proof image (sometimes referred to as proof and printed proof). The next phase is the makeready/color OK phase. In this phase, the press operator works with the print buyer to adjust the particular press or presses being employed to assure that the actual printed images sufficiently match the proof image. Finally, once the makeready phase is complete, the printing phase begins. During the printing phase, the shippable printed product is produced, and bound if desired for shipment to the consumers.

During the makeready portion of a print run, an image scanner 301 views the printed product 206 to create a scanned image 302. The image capturing device or image scanner 301 measures the color of the printed product 206 at a plurality of sampling locations.

Figure 5:
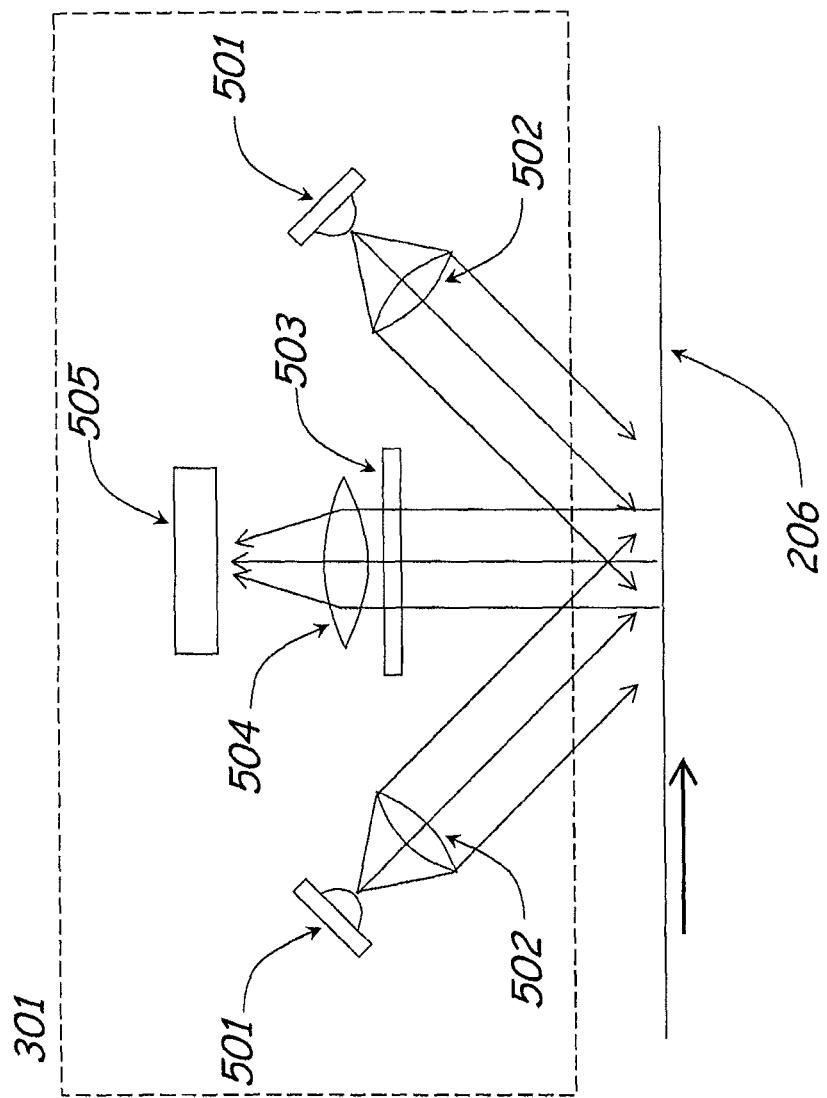
FIG. 5 is a schematic illustration of an image capturing device configured for use with the virtual ink desk of FIG. 4.

The image scanner 301, shown schematically in FIG. 5, is designed to measure the color of the printed media 206 at a multiplicity of preferably adjacent locations. The size of these locations depends upon the application, but may be, for example, 0.010 inch by 0.010 inch. Preferably, the measurement locations will cover substantially all of the saleable work 204.

The measurements may be reported in the CIELAB color space or in the sRGB color space, but may be in whatever color space best serves the application. In preferred constructions, the color space used is such that the captured image is color-correct.

Thus, the image scanner 301 will produce a scanned image of preferably the entire saleable work 204 at a fine enough resolution and high enough color fidelity so as to be useful for visual inspection.

For the purposes of this patent the term color-correct shall be taken to mean that measurements of color made with the image scanner 301 shall be accurate to within a tolerance of a standard color space which is designed so as to predict the visual appearance of a color, such as CIELAB or CIELUV. The tolerance required is application dependent. For web offset printing, for example, where tolerances for printed colors may be 4 $\Delta E$ of target values (see ISO 12647-2), an acceptable accuracy tolerance may be 2 ΔE. In particular, it should be noted that measurements made with a typical flatbed image scanner, or color camera are frequently not color-correct and are device dependent without the aid of a device profile. Even with a device profile, color correctness will often be media and pigment set dependent. The use of device dependent color spaces, such as RGB or CMYK, are in general not color-correct without a device profile. On the other hand, images stored in a color space such as sRGB or CIELAB are generally color-correct.

As discussed, preferred systems combine the various images to produce a single scanned image 302 of the entire repeating portion of the printed media 206.

The scanned image 302 is transmitted via a transceiver 440 or transmitter (shown in FIG. 4a) from the print device to a computer 438 of the virtual ink desk 400 for further review and/or processing. The computer includes a second transceiver 445 (shown in FIG. 4a) that receives the scanned image 302 at the computer. Before proceeding, it should be noted that the term "transmitted" should be interpreted broadly to include virtually any system which delivers the captured image to the computer. As such, a wireless transmission, transmission through a wired network, through a direct connection, via the Internet, or any other direct or indirect connection should be considered a transmission. In addition, the transceiver should be interpreted as any device capable of sending and/or receiving data, whether wirelessly, via a wire, or using other means. Thus, a modem, an Ethernet card, and a wireless transmitter should all be considered transceivers. In addition, transmitters or receivers, while only able to transmit or receive data respectively, should also be considered transceivers.

Figure 4A:
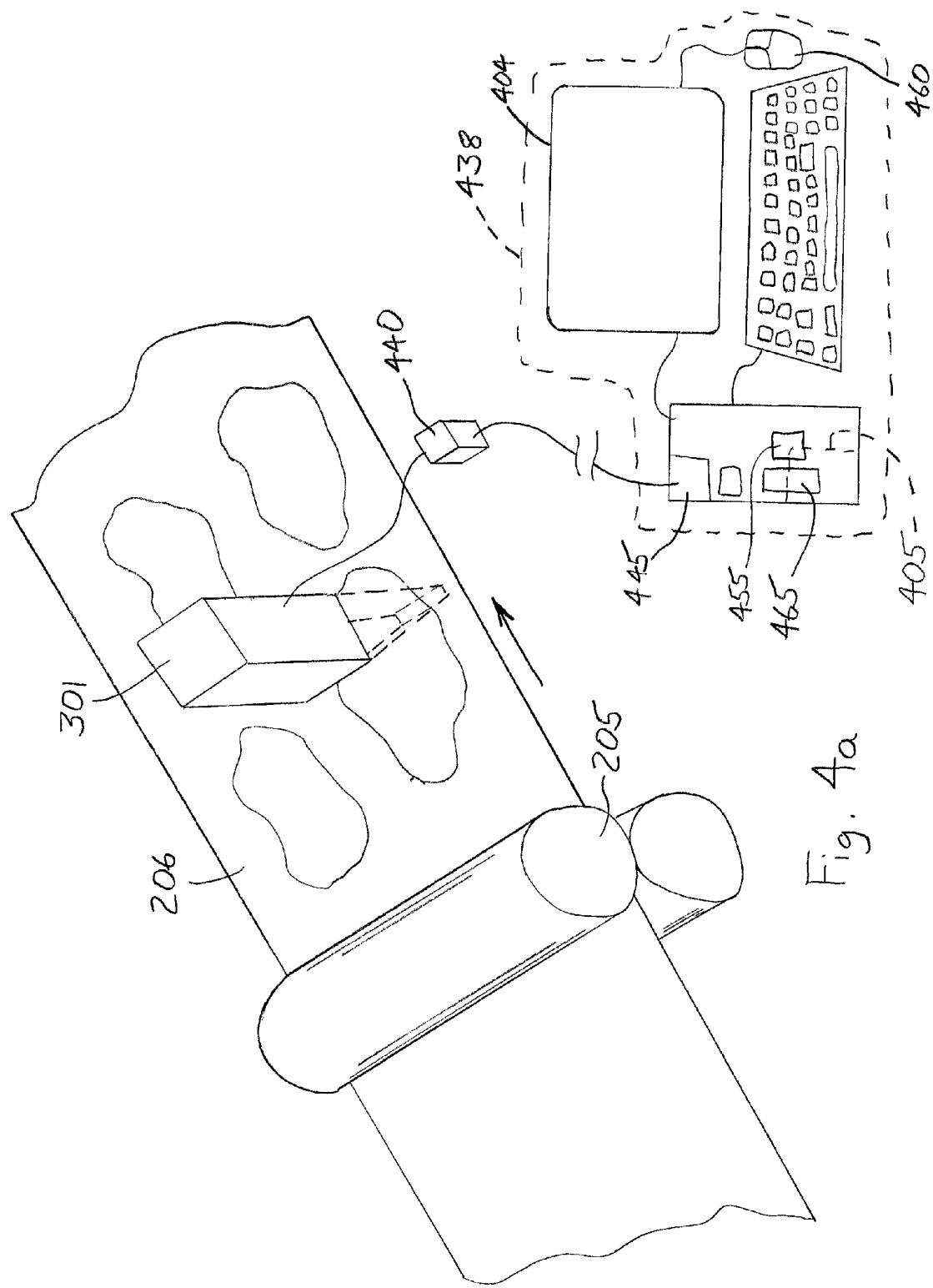
FIG. 4a is a perspective schematic view of the print device and virtual ink desk of FIG. 4.
Figure 4B:
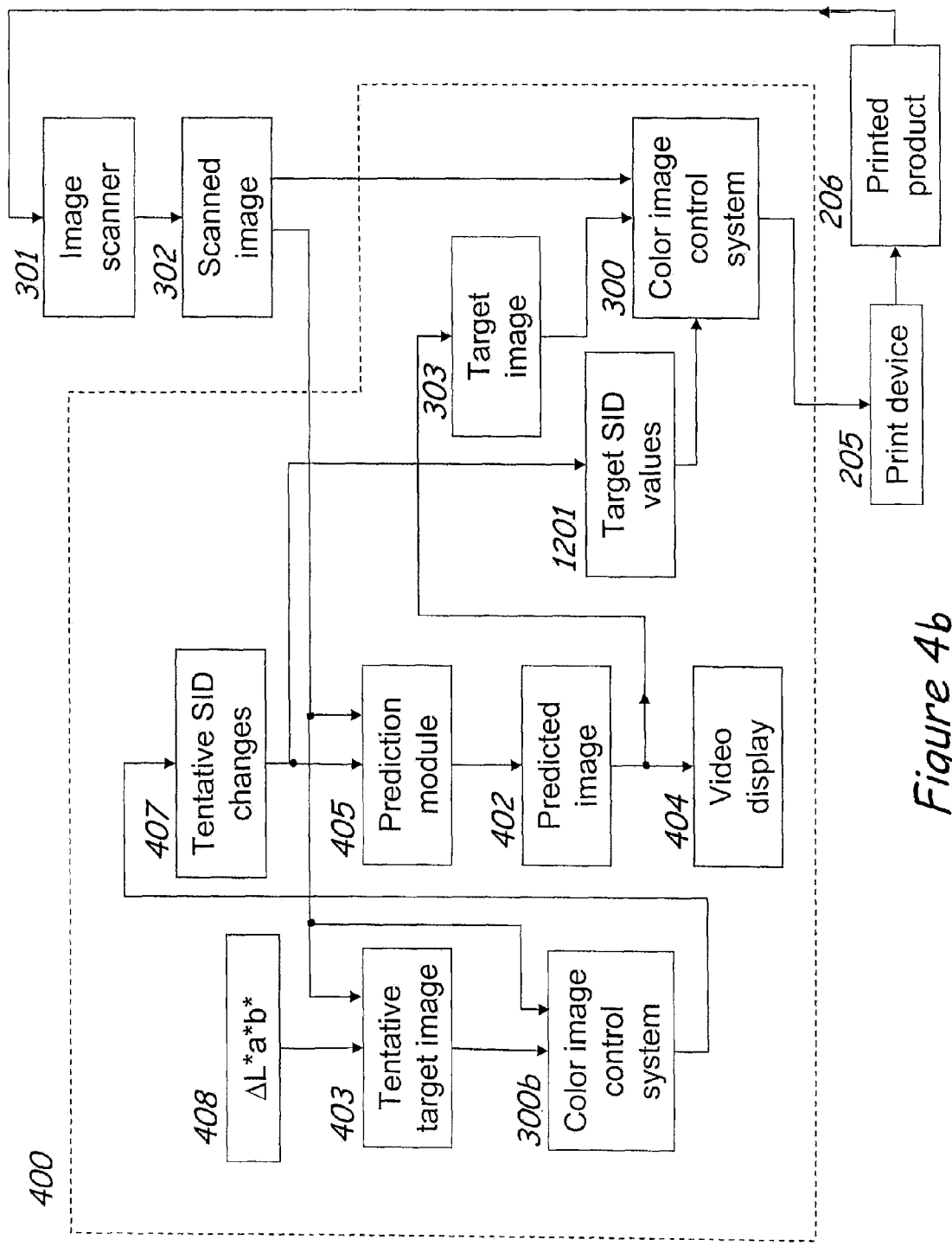
FIG. 4b is a flow chart illustrating operation of the print device including the color control system and the virtual ink desk.

As shown in FIG. 4a, the computer includes a video display or monitor 404, a processor 455, an input device 460, a storage device 465 and the transceiver or transmitter 445. The processor operates to display a user interface on the video display. The user interface allows a user to work with the various images that are presented. Before proceeding, it should be noted that a user could include, without limitation, a customer, a print owner, a press operator, a representative, etc. In one construction, a touch screen is employed as the user interface. However, preferred constructions employ other input devices (e.g., mouse, puck, trackball, pen, etc.). Thus, the computer of FIG. 4a, contains or performs most, if not all, of the items illustrated in FIG. 4. Of course, other constructions may divide these items or steps among more than one computer as desired.

The user interface uses the video display 404, which serves as a video display device and may be, for example, a cathode ray tube, a liquid crystal display, a projection device, a plasma display, or the like. The video display 404 has preferably been calibrated so that it is colorimetrically correct.

Figure 2:
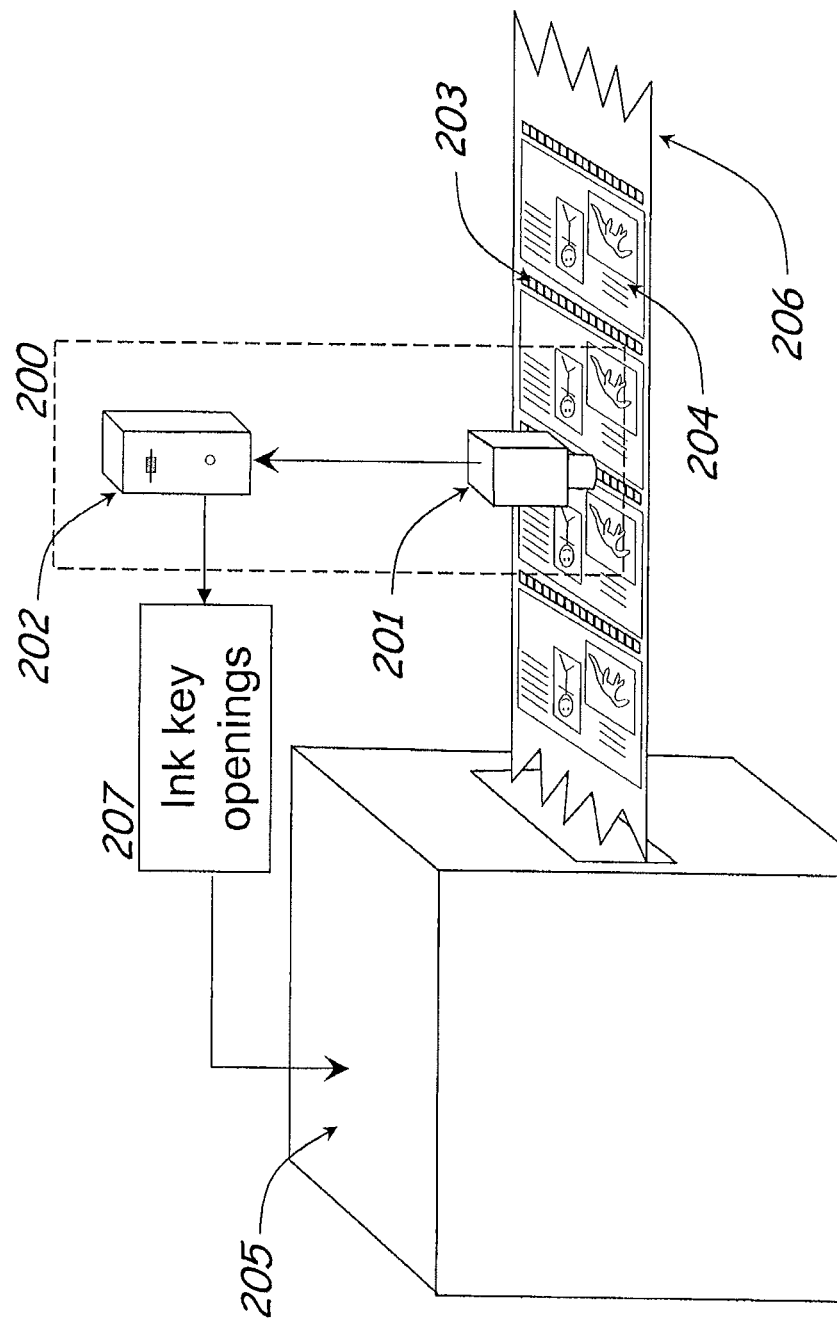
FIG. 2 is a perspective schematic view of a prior art color bar control system for a print device.

This scanned image may be transmitted to a colorbar control system 200 (FIG. 2), which provides adjustments of the adjustable ink control devices in order for the colorbar measurements to be within a tolerance of the target SID (solid ink density) values 1201.

Preferably, this scanned image 302 will be passed to a color image control system (CICS) 300. Such a system utilizes the saleable work 204, rather than the colorbar 203 alone to decide if and how adjustments to inking levels need to be made. The color image control system 300 may act in consort with a colorbar control system 200 to effect the adjustments, or it may make the adjustments directly.

It is to be appreciated that the actions of a press operator may be used to initially adjust the inking levels. Alternately, a preset system may provide this same functionality.

As a result of the actions of the color image control system 300 or other such mechanisms for the initial setting of the adjustable ink control devices, the printed media 206 will match the printed proof to some level. In practice, it is generally the case, however, that further adjustments of the ink control devices is necessary to bring the printed media 206 within an acceptable color match.

Thus, it is a common practice that a print buyer or print buyer representative provide an initial approval, commonly known as a color OK. Prior to color OK, printed product 206 may not be acceptable for shipping.

To perform a color OK in the prior art, the press operator operates the print device 205 to generate printed product 206. A sample of the printed product 206 is placed on an ink desk 100 or similar device alongside the proof and adjustments are made. The print device 205 is again operated and another sample of the printed product 206 is placed on the ink desk 100.

If the print device 205 is a web offset printing press, this press will be continuously operating and generating waste during this time period. It is also necessary on a web-offset printing press to wait for an adjustment of the ink control devices to settle out before pulling another sample.

This process repeats until the printed media 206 meets the approval of the print buyer, which may unfortunately require multiple iterations, thus creating copious waste.

The virtual ink desk 400 shortens the color OK process by displaying for the press operator and the print buyer a prediction of what a given adjustment to the ink control devices will look like. Tentative changes can thus be evaluated without the need of producing the waste on press.

The scanned image 302 is displayed on the video display 404, optionally shown in split screen mode along with the target image 303. The press operator then enters tentative SID (solid ink density) changes 407 through the color adjustment screen 1500.

Figure 15:
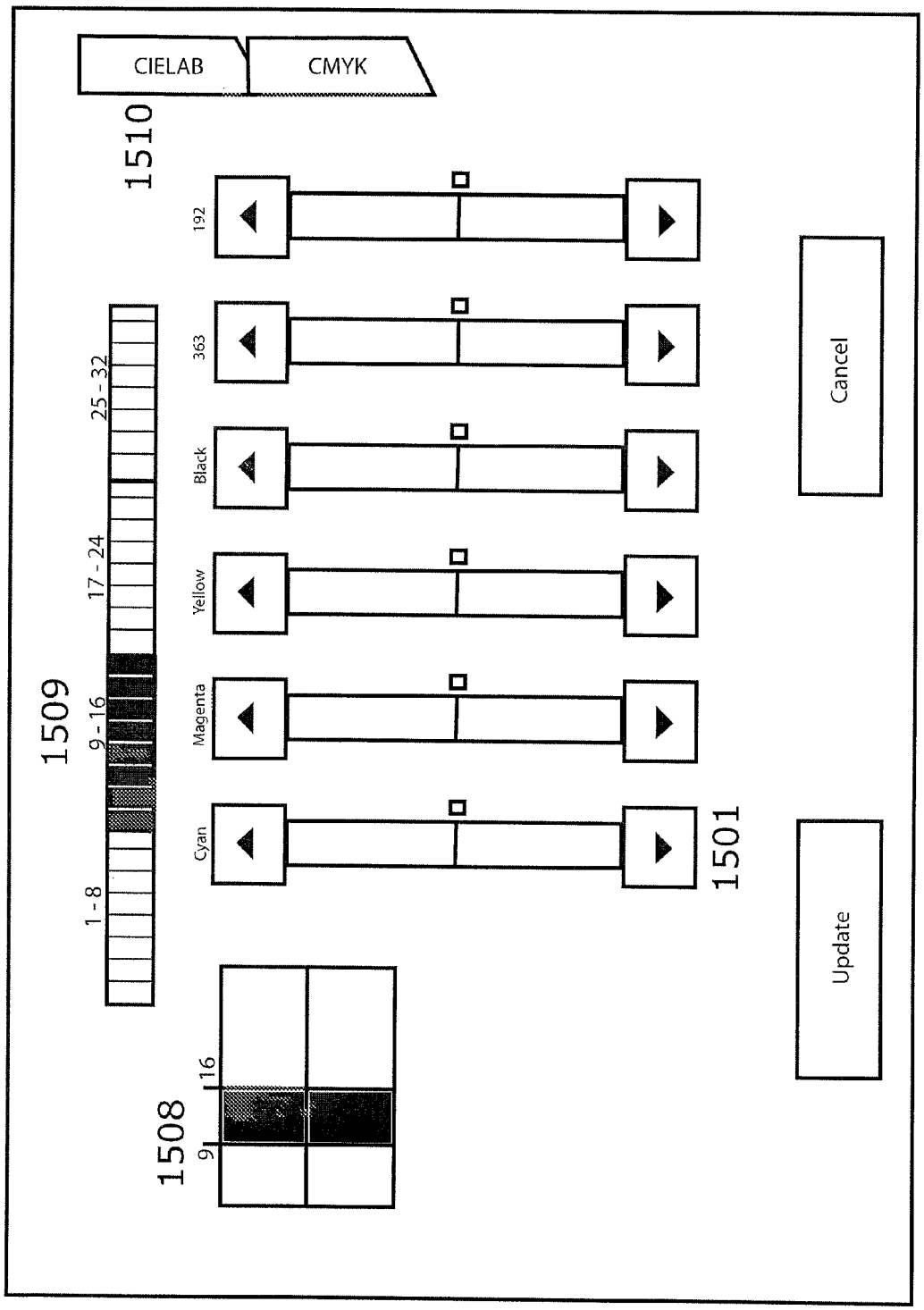
FIG. 15 is a view of another user interface screen of the virtual ink desk of FIG. 4 that shows the color adjustment controls for making changes using CMYK density.

The color adjustment screen 1500 as shown in FIG. 15 allows color moves that include indirect adjustments of CMYK ink key openings 207. In this user interface 1500, bars with up and down adjustments 1501-1506 are presented to allow the user to indirectly manipulate the CMYK colors for the selected area. In addition, adjustments are provided for any custom inks or colors that may be employed. In this user interface 1500, a small image of the printed web is also displayed to show the region being adjusted. The small image may be a portion of the target image 303 or the scanned image 302, for example. In other constructions, direct manipulation of the ink keys may be facilitated by the virtual ink desk.

Specifically, as shown in FIG. 12, the prediction module 405 makes changes to the scanned image 302 so as to predict the appearance of the printed media 206 as if those tentative ink key openings 407 were implemented at the print device 205. Once the predicted image 402 has been determined, this predicted image 402 will be displayed on the video display 404. In this way, the user has immediate feedback as to how a contemplated color move may change the color of the selected area as well as the color of the entire printed media 206. This will allow a relatively novice press operator to make intelligent decisions about how to adjust color.

If the predicted image 402 is not deemed a suitable match, the press operator may request additional color changes. This process continues until the user has found a suitable match. At this time, the press operator issues a command to enact the requested changes. The tentative SID changes 407 will be transferred to the target SID values 1201, and the predicted image 402 will be transferred to the target image 303, so that the colorbar control system 200 or the color image control system 300 will revise its control so as to meet the revised target points.

Alternately, the tentative SID changes 407 will be transferred to the target SID values 1201 without transferring the corresponding predicted image 402 to the target image 303. The colorbar control system 200 will thereafter be enabled until the measurements of the colorbar 203 have gotten to within a tolerance of the target SID values 1201 and optionally when inking levels on the high-speed print device have settled out. Thereafter, the following scanned image 302 will be transferred to the target image 303.

The prediction module 405 uses the scanned image 302 as a starting point from which to estimate the effect that the tentative ink key openings 407 would have on the image of the printed media 206, were these changes to be sent to the print device 205. To determine this estimation, the prediction module 405 utilizes the scanned image 302, the ink key openings 207 that were used to produce this printed media 206, the tentative ink key openings 407, and the sensitivity matrix 305.

A difference is computed between the ink key openings 207 that were used to produce this printed media 206 and the tentative ink key openings 407. This difference in ink key openings is multiplied by the sensitivity matrix 305 to estimate the amount of color change. The color change is then added to the scanned image 302 to arrive at the predicted image 402.

The predicted image 402 can be determined from the scanned image 302, the tentative SID changes 407, and the sensitivity matrix 305 according to the following equation.

$$\begin{bmatrix} \Delta_{L^*}(1) \\ \Delta_{a^*}(1) \\ \Delta_{b^*}(1) \\ \Delta_{L^*}(2) \\ \Delta_{a^*}(2) \\ \Delta_{b^*}(2) \\ \vdots \\ \Delta_{L^*}(n) \\ \Delta_{a^*}(n) \\ \Delta_{b^*}(n) \end{bmatrix} = \begin{bmatrix} S_{L^*,C}(1) & S_{L^*,M}(1) & S_{L^*,Y}(1) & S_{L^*,K}(1) \\ S_{a^*,C}(1) & S_{a^*,M}(1) & S_{a^*,Y}(1) & S_{a^*,K}(1) \\ S_{b^*,C}(1) & S_{b^*,M}(1) & S_{b^*,Y}(1) & S_{b^*,K}(1) \\ S_{L^*,C}(2) & S_{L^*,M}(2) & S_{L^*,Y}(2) & S_{L^*,K}(2) \\ S_{a^*,C}(2) & S_{a^*,M}(2) & S_{a^*,Y}(2) & S_{a^*,K}(2) \\ S_{b^*,C}(2) & S_{b^*,M}(2) & S_{b^*,Y}(2) & S_{b^*,K}(2) \\ \vdots & \vdots & \vdots & \vdots \\ S_{L^*,C}(n) & S_{L^*,M}(n) & S_{L^*,Y}(n) & S_{L^*,K}(n) \\ S_{a^*,C}(n) & S_{a^*,M}(n) & S_{a^*,Y}(n) & S_{a^*,K}(n) \\ S_{b^*,C}(n) & S_{b^*,M}(n) & S_{b^*,Y}(n) & S_{b^*,K}(n) \end{bmatrix} \begin{bmatrix} \Delta_C \\ \Delta_M \\ \Delta_Y \\ \Delta_K \end{bmatrix}$$

The variables are defined as follows $\Delta_C$, $\Delta_M$, $\Delta_Y$, and $\Delta_K$ are the tentative SID changes 407 for the cyan, magenta, yellow and black inks, $S_{L^*,C}$ (i) (for example) is the "sensitivity" of the L* value of the $i^{th}$ pixel to a unit change in the cyan SID. A unit change in the solid ink density of cyan will make this large of a change in the L* value, and $\Delta_{L^*}$ (i), $\Delta_{a^*}$(i), $\Delta_{b^*}$ (i) are the resulting color differences for the $i^{th}$ pixel, i=1, 2, 3, . . . , n. These values are added to the corresponding pixels of the scanned image 302 to produce the predicted image 402.

In the foregoing section describing the calculation of the predicted image 402, the scanned image has been used as the starting point from which to make the predictions. Alternately, it may be beneficial to start with the target image 303.

The virtual ink desk 400 may be beneficially employed to perform a remote color OK. Whereas today it is common for print buyers to send a representative to the printing plant for a color OK, it now becomes possible for this to be accomplished remotely.

It is known in the art to retrieve a portion of the printed product 206 and scan this using a commercially available flatbed scanner. An ICC profile is then used to convert the native RGB output of the flatbed scanner to CIELAB values so that a color-correct image of the printed product 206 may be displayed on a calibrated monitor at the print buyer's location.

The time consuming step of profiling the flatbed scanner for each print condition is obviated through the use of an image scanner 301 that incorporates a spectrophotometer, or is otherwise color-correct, as in for example, the use of spectral response functions which are a linear combination of the tristimulus functions. If the image scanner is located so as to be able to scan the printed product 206 automatically, as in the preferred embodiment, a second time consuming step, that of loading the printed product onto the flatbed scanner, is similarly obviated.

The image scanner 301 captures a color-correct scanned image 302 of the printed product 206 which is transmitted via the transceiver to a virtual ink desk 400. The virtual ink desk 400 may be located locally (i.e., in the same building or printing facility as the print device) and/or may be located remotely (i.e., in a different facility or city). The captured image is compared to the original proof to determine if the colors match. This original proof may be a hardcopy (i.e., printed) proof, or it may be a digital representation of the proof, displayed on a computer monitor. Preferably, the original proof may be a display of the target image 303 on the video display 404. The virtual ink desk 400 allows for a side-by-side comparison of the proof or target image and the captured image. In addition, the images can be zoomed or panned to allow for a thorough inspection.

Adjustable ink control devices from a location remote from the press has heretofore been limited by the need for the press operator to retrieve a sample of the printed product 206 from the print device in order to ascertain the required color changes. Thus, it has not been practical to adjust ink control devices from a distance of more than perhaps a few hundred feet.

The virtual ink desk 400 as described herein may be operated remotely, which is to say, the operator may initiate ink control device adjustments from a press office, for example, located at some distance from the print device 205 itself. Additionally, the virtual ink desk 400 could be located at the print buyer's facility in a different city if desired. The print buyer could make all of the adjustments necessary to adjust the image to a desired image and implement the ink key changes, thus reducing the role of the press operator. However, ideally, the experienced press operator facilitates the adjustments and the print buyer reviews and approves the results remotely.

The invention as described herein is one-to-one, i.e. there is one virtual ink desk 400 controlling a single printing device 205. The current invention may benefit from being configured in a one-to-many mode. In a particularly advantageous embodiment of this invention, a single virtual ink desk 400 may be configured so as to control both the bottom side and the top side of the printed media 206. This may be accomplished, for example, by programming the system so as to toggle between the two sides of the web. This principle applies equally well to a single virtual ink desk 400 controlling both webs of a two web press, or controlling more than two presses.

If a virtual ink desk 400 has access to image data from a number of presses, say for example, through a computer network, then it is possible for a single virtual ink desk 400 to control a multiplicity of print devices 205. In this way, a single skilled press operator may perform the color OK phase on many presses.

It is also possible for a multiplicity of virtual ink desks 400 to control a single print device 205 (many-to-one). This may be useful, for example, if one virtual ink desk 400 is located in the proximity of the print device 205, a second virtual ink desk 400 is located in the press office of the printing plant, and a third virtual ink desk 400 is located at the site of the print buyer.

In a particularly advantageous embodiment of this many-to-one configuration, the remote virtual ink desks 400 (those in, for example, the press office and at the print buyer site) have a subset of the functionality of the virtual ink desk 400 located at the press. In particular, the print buyer sites may only be allowed to view the scanned image 302 and the target image 303. This functionality allows a print buyer to remotely approve of the color rendition. This saves the print buyer the time and expense required to travel to the printing plant.

The previously described virtual ink desk 400 embodiment exemplified by FIG. 12 is one that most closely fits the current operation of a print device 205. For example, operators of web offset printing presses are familiar with the adjustment of ink keys in order to control the density of ink within an ink key zone. Thus, the embodiment of FIG. 12 is most efficacious for trained press operators.

Others less familiar with the operation of a print device 206 may find it advantageous to adjust color in a way that does not necessitate a detailed understanding of ink keys and of density.

In the preferred embodiment of the virtual ink desk 400, the press operator views the scanned image 302, possibly alongside the target image 303, and selects some area of the image wherein it is deemed that color should be modified. The press operator then enters a contemplated color change for the selected area.

The virtual ink desk 400 will then compute the tentative SID changes 407 required to effect the contemplated color change for the selected area. Next, the prediction module 405 will determine the predicted image 402 if those SID changes were to be sent to the print device 205. This predicted image 402 will be displayed on the video display 404 for the press operator.

Figure 7:
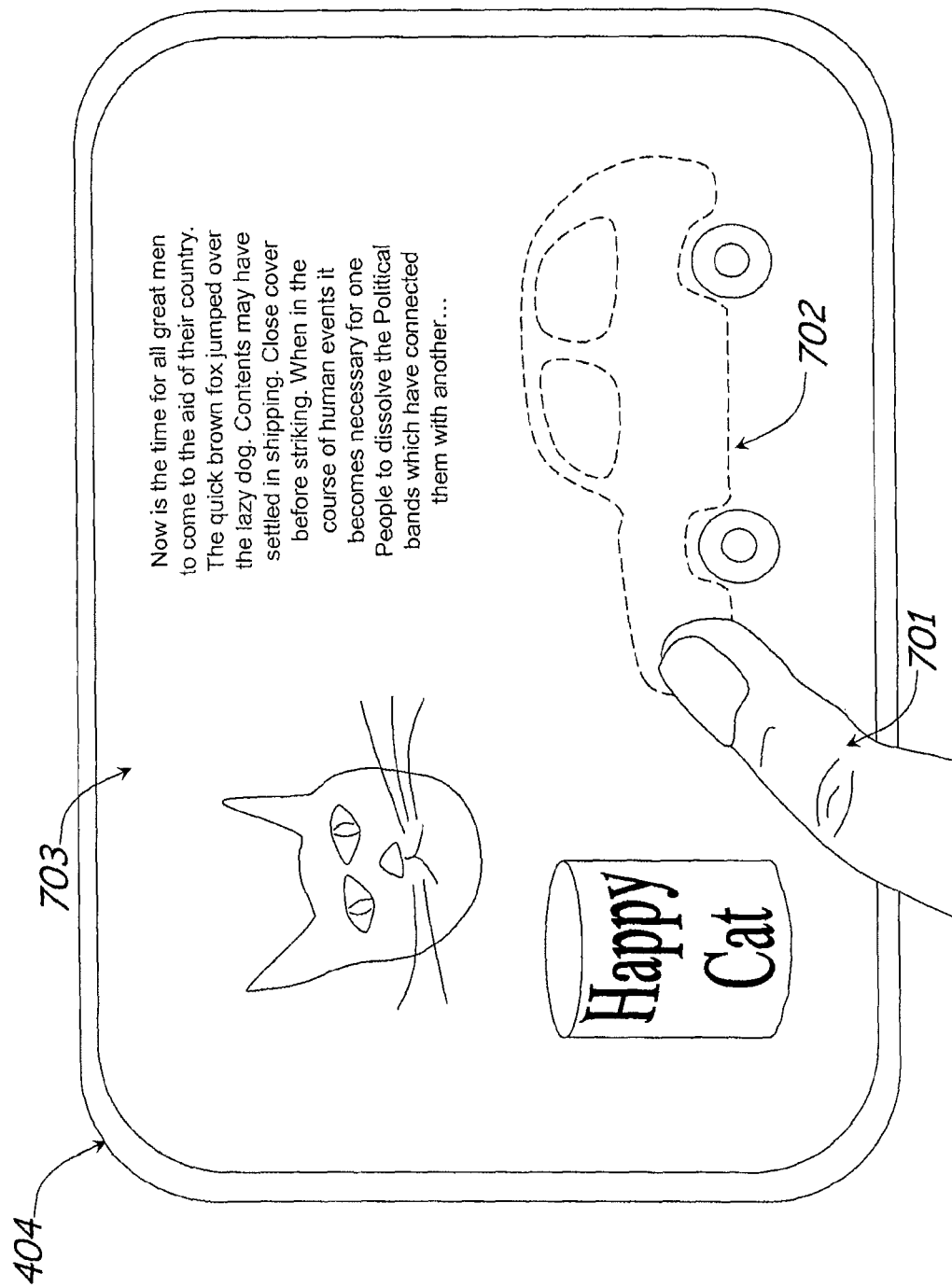
FIG. 7 is a view of a user interface screen of the virtual ink desk of FIG. 4.

When a user (e.g., press operator, print buyer, supervisor, etc.) selects a selected area 702 for adjustment, the user interface 401 must determine which pixels the user intends to be adjusted. The user interface 401 will then provide feedback to the user as to which pixels have been selected. This feedback may be done, for example, by flashing the selected pixels, or by indicating the border of the selected pixels by means of a dotted line or a flashing dotted line. This flashing dotted line has been nicknamed "marching ants" in the industry. In FIG. 7, a dotted line is used to indicate the border of the selected area 702, which in this case is the body of the car. In the preferred embodiment (FIG. 13), a border is used to indicate a portion of the image that has been selected (1301 and 1302), along with reducing the saturation of the rest of the image (i.e., graying out the rest of the image).

There are a variety of methods that may be employed by the user interface 401 in order to define the selected area 702. In the simplest implementation, only the pixels directly indicated by the user interface are selected.

In a more sophisticated embodiment, the pixels directly selected by the user interface (hereinafter referred to as "directly selected pixels") are selected, as well as those pixels (indirectly selected pixels) that are proximate to the directly selected pixels, and that have color values similar to the directly selected pixels. To identify such indirectly selected pixels, an iterative algorithm may be used.

In this iterative algorithm, the set of directly selected pixels become the initial set of selected pixels. The mean color value of this set is computed and any outliers are eliminated from the set of selected pixels.

Next, any pixels directly adjacent to any of the selected pixels are examined. If the color values of any of the examined pixels are within a certain tolerance of the mean color value of the selected pixels, then these pixels are added to the set of indirectly selected pixels. This tolerance may be, for example, a predetermined $\Delta E$. Thus, this system will select adjacent similarly colored pixels.

Alternately, the tolerance for acceptance may be a $\Delta E$ derived from the statistical properties of the color values of the selected pixels. For example, the $\Delta E$ between the color values of each of the selected pixels and the mean of the selected pixels is computed. The mean and standard deviation of this set of $\Delta E$ values is computed and the upper threshold tolerance might be taken, for example, as the mean $\Delta E$ plus three times the standard deviation of the $\Delta E$ values.

The mean and standard deviation of the set of selected pixels may be computed over only the directly selected pixels, or it may include indirectly selected pixels if desired.

This process of evaluating adjacent pixels and potentially adding them to the set of selected pixels is continued until there are no additional adjacent pixels that should be added. The final set of selected pixels will become the selected area 702.

This implementation may not work well for areas of an image where the color is slowly changing across the image as is typically the case for a shaded area of an image. It may be beneficial to modify the acceptance criteria so that a pixel is added to the set of selected pixels if it is adjacent to a selected pixel and if the color value of the pixel is within a certain $\Delta E$ of the previously selected pixel. Equivalently, the set of selected pixels is grown in all directions until an edge is reached.

In this way, it is easy for the user to select all the pixels that correspond to a specific object in the image, for example, a sweater or a car. Since objects with natural lighting tend to exhibit a range of brightness, but do not change significantly in hue or saturation, it is advantageous to use a modification of the $\Delta E$ calculation that places less emphasis on the difference in $L^*$ value by weighting the $L^*$ difference when a color difference is calculated.

It is also possible to restrict the growth of the set of selected pixels to within an ink key zone 103, to within several ink keys zones, or to within a page if desired.

It may be advantageous in some circumstances for a selected area 702 to encompass a variety of disjointed areas on the printed product 206. There may be, for example, a number of images of the same or similar objects on the printed product 206. One common example of this is the letters of the title of a magazine. Such a title on the cover of a magazine often has tight requirements for color. To meet this need, the user interface 401 may allow additional groups of pixels to be added to the selected pixels when the user indicates another area of the image. Alternately, the user interface 401 may automatically search the entire image, or entire page for color values that are within a certain tolerance of the color of the selected pixels.

Figure 13:
FIG. 13 is a view of another user interface screen of the virtual ink desk of FIG. 4 showing a selected region of interest.

In the preferred embodiment, the user traces with a mouse 460 or other suitable pointing device an outline of those pixels that are to be selected, as shown in FIG. 13. The outline that is traced may be limited to a simple geometric figure such as a rectangle or ellipse. The outline may alternately be an arbitrary polygonal figure that connects an ordered set of image coordinates or a random curve that follows the pixels selected by the user. In still another embodiment, the outline may be a Bezier curve that smoothly traces through an ordered set of image coordinates. In still other constructions, other outline types or combinations of those described may be employed. For any of the thus generated outlines, the outline may be taken directly, or the outline may be refined so as to occur at the nearest edges of the image. In the preferred embodiment, the user interface 401 allows the user to select among these methods of specifying the selected area 702.

As discussed, this functionality may be arrived at, for example, by using a suitable computer pointing device such as a mouse 460 or trackball, or by typing image coordinates on a keyboard or through repeated use of arrow keys. Similar functionality could be attained through an eyeball tracking device. Additionally, a touch screen may be employed if desired, however, touchscreens utilized in a printing environment frequently become dusty and smeared with ink. This severely detracts from the color fidelity of the monitor.

Once the selected area 702 has been determined, the user interface 401 presents the user with a color adjustment screen 1400 for the modification of the color of the selected area 702. Preferably, the color changes that are available to the user through the user interface include: a change in hue, in saturation, or in brightness. Examples of potential user interface screens are illustrated in FIGS. 8, 14 and 15.

Figure 14:
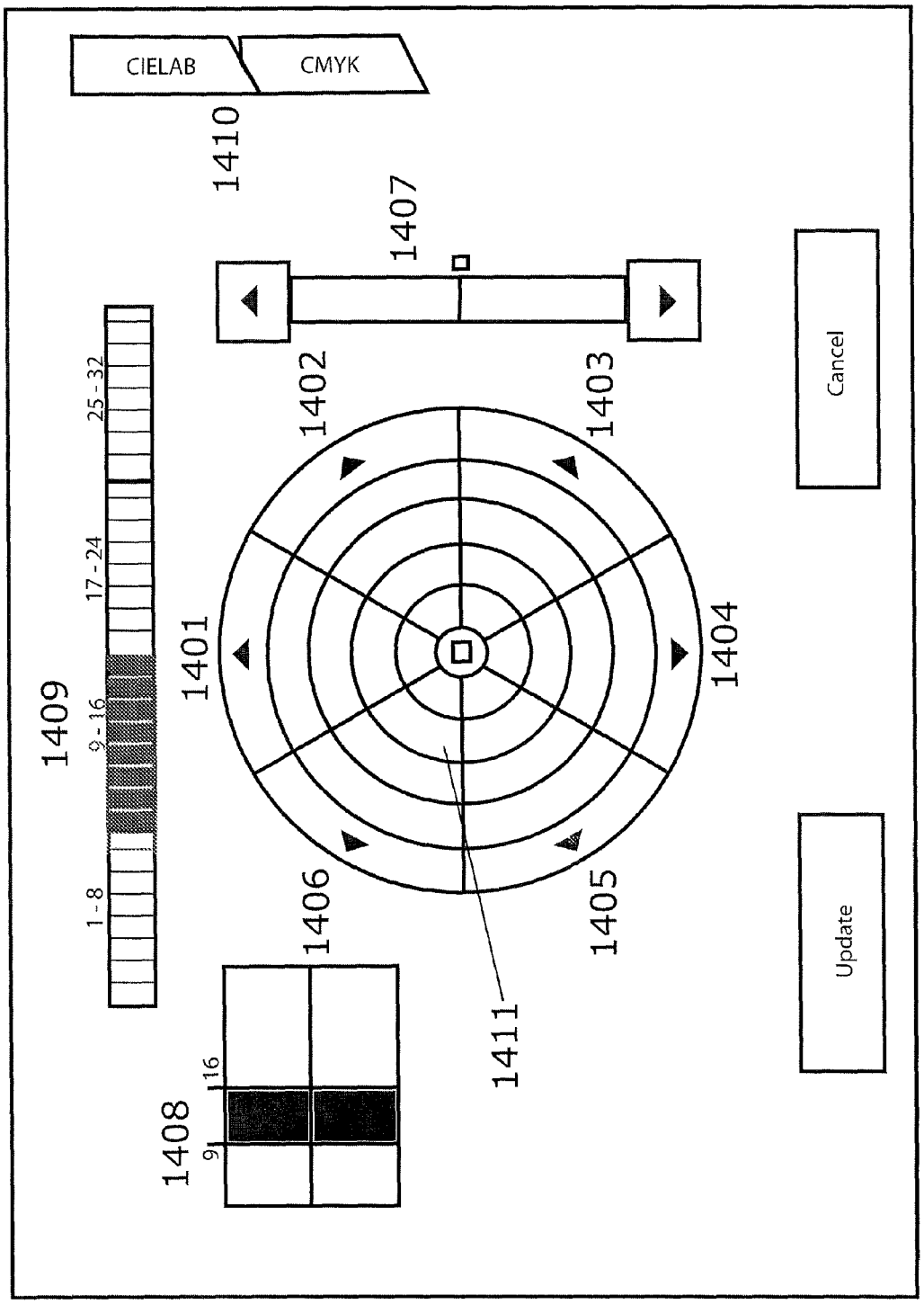
FIG. 14 is a view of another user interface screen of the virtual ink desk of FIG. 4 that shows the color adjustment controls for making changes in the L*a*b* color space.

FIG. 14 illustrates the preferred embodiment color adjustment screen 1400 that includes a color wheel 1411 that facilitates the color adjustment for the selected pixels or region. The user interface screen 1400 of FIG. 14 is similar to the one of FIG. 15, with the exception of the color control mechanism. The center of the circle represents the current color, thereby allowing a user to simply selects an arrow 1401-1406 on the outer periphery of the wheel 1411 to increase the color in that direction. The gray bar 1407 to the right of the color wheel 1411 can be used to increase or decrease the lightness of the color. The arrows 1401 through 1406 allow adjustments in the Yellow, Red, Magenta, Blue, Cyan and Green directions, respectively.

In addition, an ink key indicator 1409/1509 extends across the top of the page and includes one space for each ink key. In this case there are 32 keys and as such 32 spaces. In the illustrated example, ink key regions 9-16 have been selected for adjustment. These ink keys are indicated as being selected in the ink key indicator 1403. Additionally, a small image of the printed product 1408/1508 is positioned on the user interface and also indicates which region is being adjusted.

Figure 8:
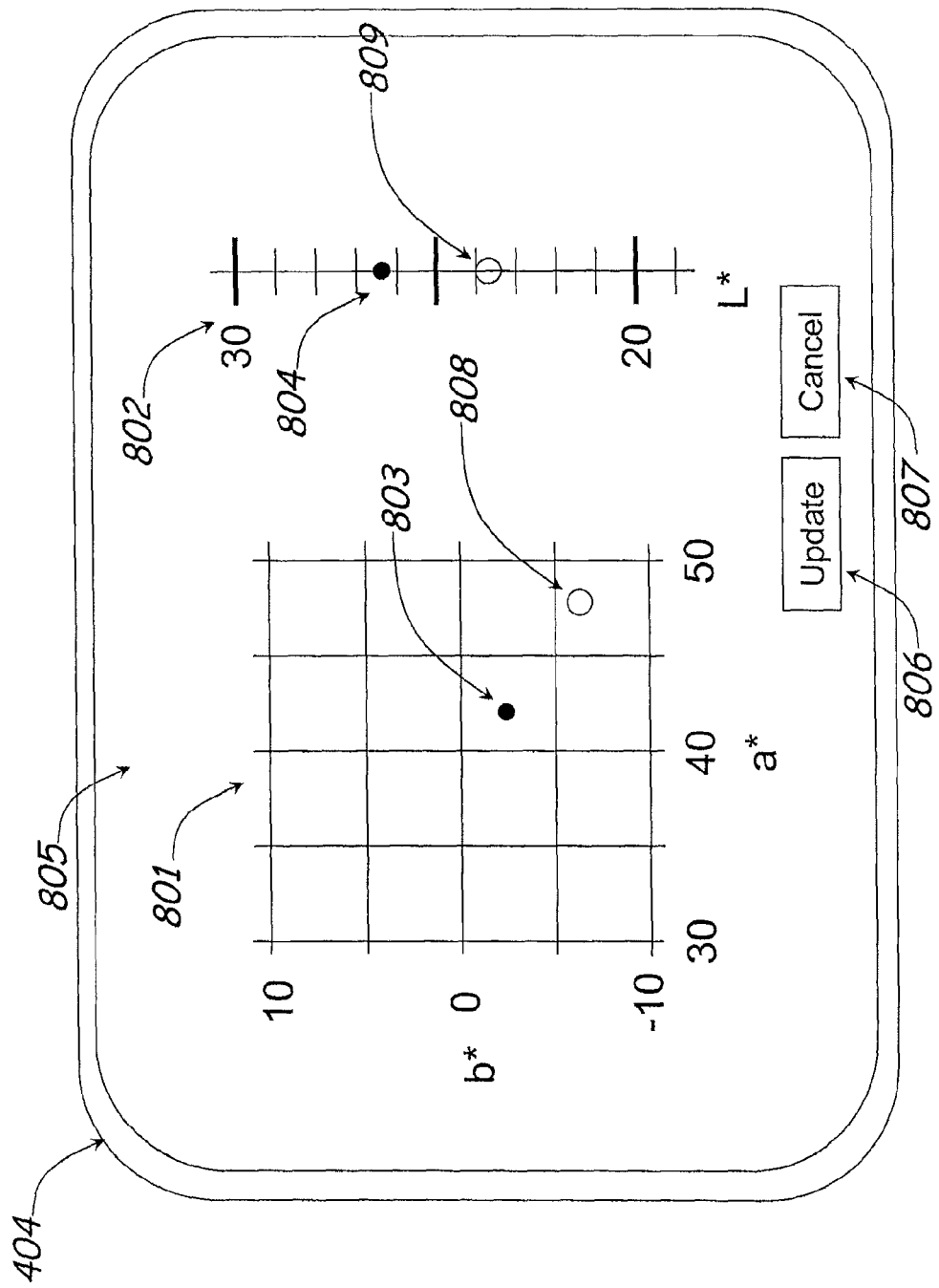
FIG. 8 is a view of another user interface screen of the virtual ink desk of FIG. 4.

In another construction, shown in FIG. 8, the color adjustment screen 805 is displayed on the video display 403. The screen includes an a*b* plane graph 801 showing a portion of the a*b* plane, and an L* number line 802 showing a portion of the range of L* values. There is an a*b* mark 803 on the a*b* plane graph 801 to indicate the average a*b* value for the selected area, and an L* mark 804 on the L* number line 802 to indicate the average L* value of the selected pixels.

Color adjustments are made by selecting either the a*b* mark 803 or the L* mark 804 using the input device in the color adjustment screen 805. The mark (803 or 804) is then repositioned by moving the input device as desired.

The resultant output of both color adjustment screens 805 and 1400 is a set of changes in L*, a*, and b* values 408.

For simplicity, the color adjustment screen 805 is depicted on the video display 404 which is used to display images such as scanned images 302, a target image 303, and/or a predicted image 402. In one implementation, the user may toggle the video display 404 between the display of images and the display of the color adjustment screen 805. For example, FIGS. 14 and 15 include side tabs 1410/1510 that allow for toggling between the two user interfaces 1400, 1500.

In another embodiment, there are two separate video displays 404 in proximity, with one video display 404 being used to display images and the other to display control screens such as the color adjustment screens 805, 1400, 1500. In this embodiment, the colorimetric requirements for the video display 404 used to display control screens are considerably less stringent than for the video display 404 used to display images.

In the preferred embodiment, images and control screens are presented simultaneously on the same video display 404. In addition, the display provides the user the ability to display a reference image, such as the target image 303, next to the scanned image 302 in a split screen format and allows for pan and zoom. In a preferred construction, a pan or zoom in one of the split screens produces an equal pan or zoom in the other of the split screens such that the two images always correspond to one another.

As the set of changes in L*, a*, and b* values 408 are adjusted through the color adjustment screens 805 and 1400 a tentative target image 403 is created. The tentative target image 403 may be created, for example, as follows. First, the entire target image 303 is copied to the tentative target image 403. Then, the color value of each pixel in the tentative target image 403 is adjusted by adding the changes in L*, a*, and b* values. Alternatively, the changes may be construed as being multiplicative rather than additive in nature.

As illustrated in FIG. 4b, when the tentative target image 403 is assembled, it will be passed to a second color image control system 300b. This system functions the same as the color image control system 300, except that it works to find the set of tentative SID changes 407 that will allow the scanned image 302 to appear most like the tentative target image 403, rather than the target image 303. Note that a single color image control module 300 may perform both functions; there is no need for two separate modules.

The output of the color image control system 300b is a set of tentative SID changes 407. From here the functioning is along the lines of that in the embodiment shown in FIG. 12. As a result, a predicted image 402 is displayed on the video display 404 which predicts what the entire image would look like if the adjustable ink control devices were adjusted so as to bring the selected area to be 702 as close as possible to the requested color change.

As the user makes color adjustments to the selected area 702 through the color adjustment screens 805, 1400, 1500, the predicted image 402 will preferably be updated on the video display 402. In this way, feedback will occur much faster than the traditional mode where the press operator must wait for the color change to settle out and then retrieve a press sheet 101. Thus, the control of color is faster and more accurate. Also, since the feedback is much faster, a press operator can be trained much quicker, and the press set-up can be approved more quickly and remotely if desired.

When the user is satisfied with the appearance of the predicted image 402, the update or OK button 806 on one of the color adjustment screens 805, 1400, or 1500 is selected. This will cause the user interface 401 to update the target image 303 so that the image color control system 300 will control to the adjusted color values as is discussed below. Various alternatives are possible for how to update the target image 303. The tentative target image 403 may be used as the new target image 303. Alternately, the predicted image 402 may be used for that purpose. In the preferred embodiment, the tentative ink key openings 407 may be loaded directly into the ink key openings 207. After a suitable delay, the target image will then be updated with the scanned image 302.

A cancel button 807 is also available for the user to abandon any tentative adjustments.

It may be useful for the target color values of the selected area 702 to be included on the color adjustment screen 805. This is depicted as the hollow marks 808 and 809. It may also be useful for the color values to be displayed numerically instead of, or in addition to the graphical display.

In the preferred embodiment, the image scanner 301 is positioned to measure printed product 206 as it moves through the press. The image scanner 301 measures the spectra at each of 128 points along a scan line 1003 perpendicular to the direction of web movement while the web is in the print device. These points are at a resolution of 0.010 inches so that the field of view is 1.28 inches. As the printed media 206 advances by 0.010 inches, another set of spectra are collected, and another, and so on to cover a full repeat at a resolution of 100 DPI. Of course other resolutions or point quantities could be employed if desired. In addition, a scanner capable of measuring more than 128 points, or multiple scanners could be employed if desired.

Figure 10:
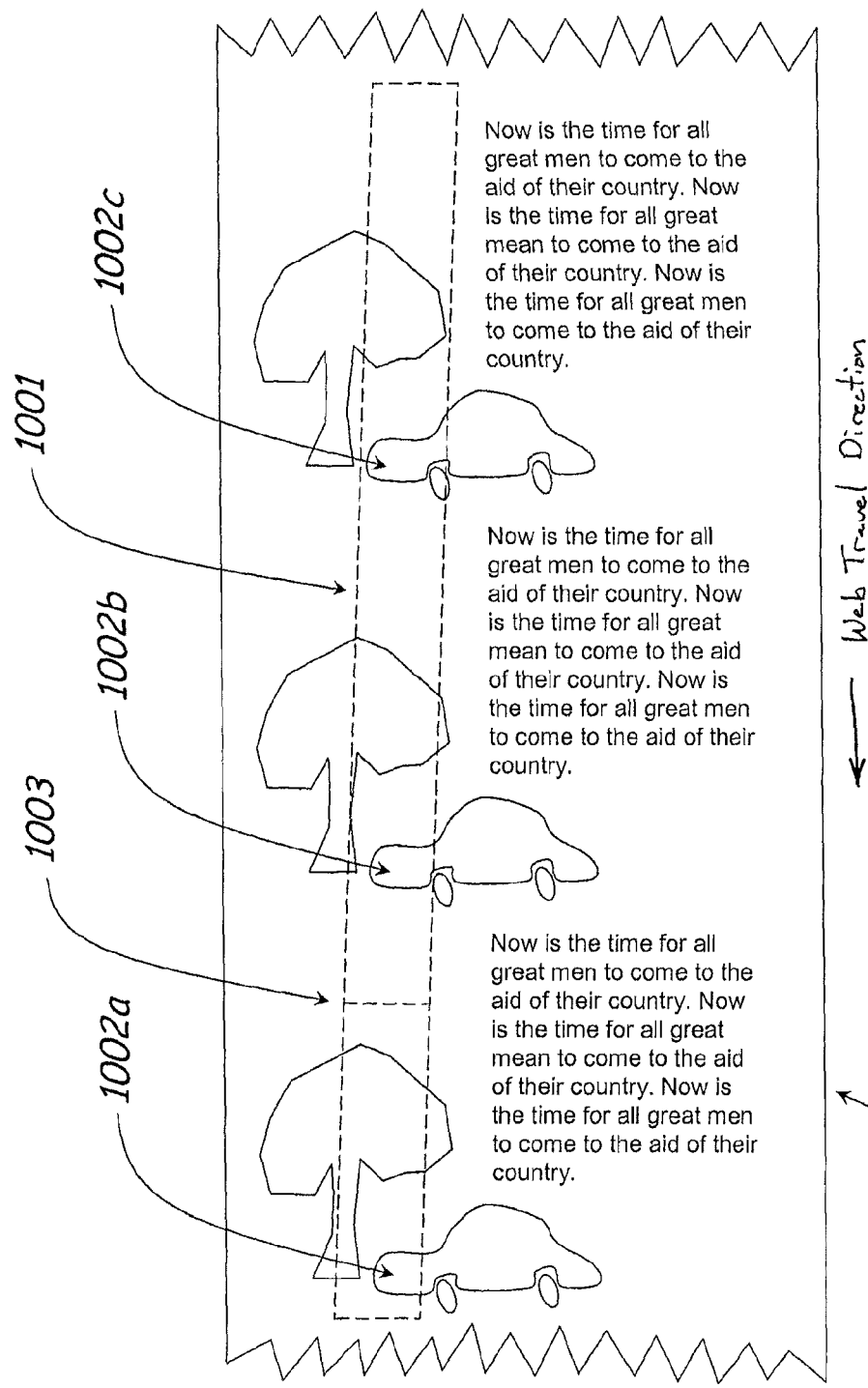
FIG. 10 is a schematic illustration of a printed web illustrating an image capture arrangement.

The image scanner 301 is mounted on a transport that moves laterally (i.e. perpendicular to the web movement direction) at a rate of one one-hundredth of the web speed. Thus, for a print job with a repeat length of 60 inches, the image scanner 301 will move laterally 0.60 inches from one repeat to the next. A portion of the image scanner swath 1001 is illustrated in FIG. 10 over three repeats. Again, other rates and print job sizes also function with the present invention.

The image scanner swath 1001 will typically pass over and collect measurements from corresponding image portions (e.g. 1002a, 1002b, and 1002c) on five or six consecutive repeats. By performing cross correlation between the most recently acquired data and data acquired from previous repeats, it is possible to determine the alignment of one set of data with the first for each repeat, and thereby average the corresponding image portions. This averaging is beneficial in that it reduces normal process fluctuations as well as sampling noise from the image scanner 301.

Figure 11:
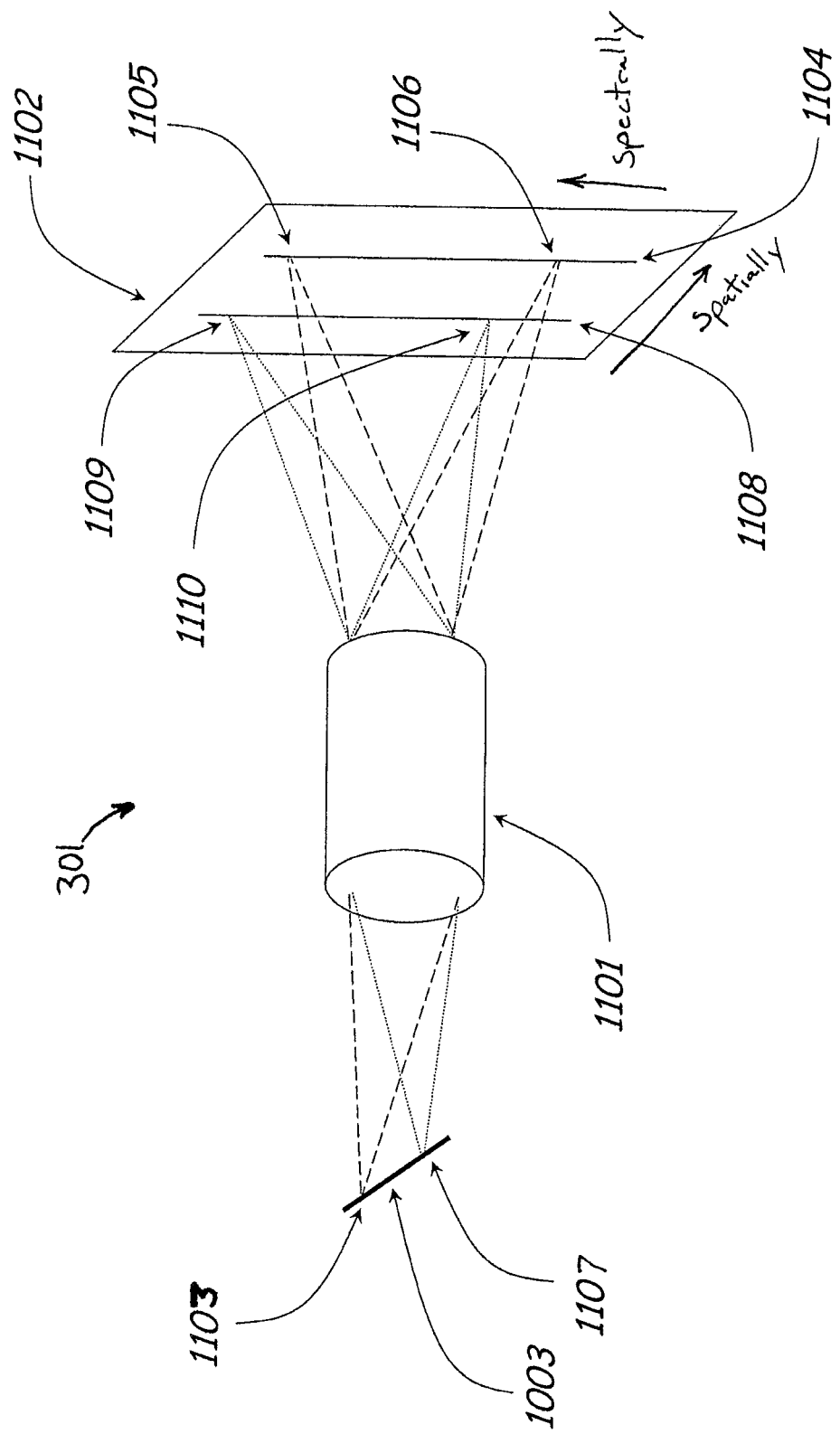
FIG. 11 is a schematic illustration of a portion of the image capturing device of FIG. 5.

FIG. 11 schematically illustrates a portion of the preferred embodiment of the image scanner 301. The image scanner 301 includes an imaging spectrograph 1101 and a two-dimensional imaging device 1102. The imaging spectrograph 1101 is constructed so as to project an image of the scan line 1003 onto a two-dimensional imaging device 1102. In one construction a CCD or a multi-tap CCD with a horizontal resolution of 128 pixels and a vertical resolution of 32 pixels is employed. In this construction, the projected image of the scan line is deployed spatially in the horizontal direction and spectrally in the vertical direction. It is to be understood that alternate light sensing technologies (e.g. CMOS) may be applicable.

In FIG. 11, light leaving a point 1103 along the scan line 1003 is focused by the imaging spectrograph 1101 onto a vertical line 1104 on the two-dimensional imaging device 1102. The point of focus on this vertical line 1104 is dependent upon the wavelength of the light. Higher wavelength light, for example, light at 700 nm, will be focused at point 1105 near the uppermost line of the two-dimensional imaging device 1102. Lower wavelength light, for example light at 390 nm, will be focused at a point 1106 near the lowermost line of the two-dimensional imaging device 1102. Thus, the amount of light impinging the two-dimensional imaging device 1102 along the vertical line 1104 will be indicative of the spectrum of light emitted from the point 1103.

In a similar fashion, light leaving a second point 1107 along the scan line 1003 will be focused along a vertical line 1108 on the two-dimensional imaging device 1102 so that the light impinging the two-dimensional imaging device 1102 along the vertical line 1108 will be indicative of the spectrum of light emitted from the point 1107.

Thus, the row address of the two-dimensional imaging device 1102 indicates the wavelength of the measured light, with the bottom-most row collecting light at for example 390 nm, the next row up collecting light at for example 400 nm, and so on, up to the 32nd row, which collects light at, for example, 700 nm. The columns of the two-dimensional imaging device 1102 correspond to positions along the scan line 1003. Thus, following the above example, the image scanner separates 128 spatial points of light, each 0.010 inches in length for a total length of 1.28 inches, into up to 32 different wavelengths or colors. Of course, a finer or coarser gradation of the wavelengths could be employed if desired. As such, the points could be divided into more or fewer than 32 wavelengths.

In the preferred embodiment, the imaging spectrograph 1102 is an ImSpector V8E with 30 um slit size as manufactured by Specim of Oulu, Finland, equipped with a Xenoplan 4:1 bilateral telecentric lens from Schneider Optics of Hauppauge, N.Y. With this lens, the pixel sites on the two-dimensional imaging device 1103 will be 63.5 μm wide by 150 μm tall.

Web speeds for a typical web offset press place constraints on the two-dimensional imaging device 1103. Web offset presses typically operate at speeds up to 3500 FPM, which is equivalent to 700 IPS. To collect 100 DPI images, the frame rate for the two-dimensional imaging device 1103 must be at least 70,000 frames per second. To read the two-dimensional imaging device 1103 at this rate, it is beneficial to have one tap per wavelength channel, so that there are a total of 32 lines of output (i.e., 32 taps).

It will be recognized that certain applications may require more or less wavelength channels, that the range of wavelengths may extend beyond 390 nm to 700 nm, and/or that the required frame rates may be slower or faster. For example, 64, 128, or more channels may be employed to provide additional color depth if desired.

The spectral data output from the two-dimensional imaging device 1103 will be processed in a conventional manner to obtain CIELAB, sRGB, or other color-correct images. Such processing may include, for example, corrections for nonlinearity, subtraction of photometric zero values, normalization against a white reference, and calculation of XYZ values. Corrections for scattered light may also be required.

It is to be understood that variations on the embodiment of the image scanner 301 are within the scope of this invention. The pixel size of 0.010 inch by 0.010 inch for the image scanner 301 is given by way of example and will depend upon the application. There may be more than or less than 128 measurements made along a scan line 1003. The image scanner 301 may scan some number of repeats without moving and then be transported laterally to scan a separate swath. In some applications, it may be preferable that the image scanner 301 span the full width of the printed media 206, or that multiple image scanners 301 be mounted across the printed product 206 so that lateral transport is not required.

In one embodiment, the image scanner 301 can be a standard flatbed scanner, equipped with ICC profiling software so as to convert RGB measurements into CIELAB values. The step of ICC profiling software is disadvantageous in that a separate profile may be needed for each combination of ink type and printed media. This need may be obviated through the use of a scanning spectrophotometer, such as the DTP70 from XRite of Grand Rapids, Mich., which measures the spectral reflectance at a numerous locations over a sheet. In these embodiments, measurements are not made directly on the print device 205 so that manual intervention is required to make the measurement.

In an alternate embodiment, the image scanner 301 is mounted so as to view a portion, say for example, one page, of the printed media 206 directly. A xenon strobe, tungsten-halogen bulb, white LEDs, or other illumination sources may be used to illuminate the printed product 206. The image scanner 301 includes a color separation prism which spectrally separates the incoming light and projects the light onto three area sensors, such as CCDs (charge-coupled devices). The color separation prism preferably includes interference filters so designed as to provide spectral responses of the three area sensors that can be translated directly into XYZ tristimulus responses as defined in CIE 15.2.

The illumination will preferably impinge the printed media at 45 degrees and the image scanner will be so designed as to view light reflected normal to the printed media 206 in accordance with the 45 degree/normal illuminating and viewing conditions specified in CIE 15.2. Other configurations of illumination and detection of light may be used, of course, as appropriate.

Figure 6:
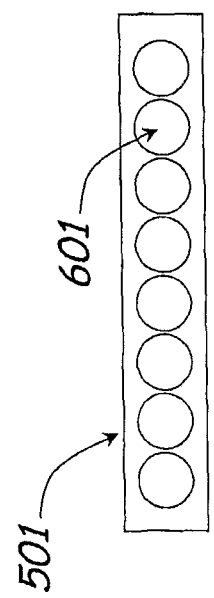
FIG. 6 is a schematic illustration of an illumination device suitable for use with the image capturing device of FIG. 5.

FIG. 5 shows still another alternate embodiment of the image scanner 301. FIG. 5 illustrates the image scanner 301 as including an illumination assembly 506 and a camera assembly 507. The illumination assembly 506 is nominally comprised of a light source 501 (shown in FIG. 6), and an illumination lens 502. The light source 501 is preferably a row of white LEDs 601, such as the Luxeon K2 manufactured by Lumileds, or equivalent.

The light emitted from the light source is collimated by virtue of an illumination lens 502. This lens may be a cylindrical Fresnel lens such as available through Edmund Optics. Alternately, the illumination lens 502 may be a parabolic or elliptical reflector. In another embodiment, the illumination lens 502 may be of the catadioptric variety, combining both refractive and reflective elements, such as are available through Fraen SRL of Italy.

In this embodiment, the illumination lens 502 is positioned so as to collimate the light. The entire illumination assembly is oriented so as to provide a sheet of illumination that impinges the printed web 206 at 45°±5°. Two illumination assemblies 506 may be included, one upstream and one downstream from the camera assembly 507. These two illumination assemblies 506 are oriented so as to illuminate substantially the same region of the printed web 206.

A portion of the light reflecting from the web is detected by the camera assembly 507. This camera assembly 507 is nominally comprised of a spectral filter 503, an imaging lens 504, and an imaging sensor 505.

The reflected light is passed first through a spectral filter 503. By virtue of the spectral filter 503, the total spectral response of the image scanner 301 approximates the tristimulus spectral responses which are used to measure CIELAB color values.

An imaging lens 504 is used to focus an image of the printed product 206 onto the imaging sensor 505. This imaging sensor 505 is preferably a linescan CCD sensor, although it could be any other suitable light-sensitive devices, such as an array of photodiodes. In order to acquire an image of the web, the sensor is provided with a signal indicative of the motion of the printed product 206, such as an encoder signal, to alert the imaging sensor 505 to acquire the next line.

The imaging lens 504 and imaging sensor 505 may, for example, be selected so as to achieve for example a resolution of 100 DPI. If the imaging sensor 505 is a linear sensor with 128 pixels, the width of the field of view would then be 1.28". In order to scan the printed web 206, the image scanner would collect a 1.28" strip of an entire impression, then move laterally to position for the next 1.28" strip. This process would continue until an image of an entire impression has been created.

In general, the measurement of CIELAB values will require at least three channels of information, collected through three separate filters. This can be accomplished in a variety of ways. In one embodiment, a set of three spectral filters 503 are mounted on a rotating turret. One at a time, the spectral filters 503 are interposed between the printed web 206 and the imaging sensor 505. Thusly, the multiplicity of channels are collected, each of a different impression. The accuracy of the spectral response can be tailored to the tristimulus curves with the addition of more than three such spectral filters 503. There may be, for example, fifteen to thirty different spectral filters 503, each spectral filter being a narrow bandpass filter.

In another embodiment, the imaging sensor 505 is a trilinear linescan CCD. Such a sensor is comprised of three parallel lines of sensing elements in close proximity. Each of the sensors is equipped with a spectral filter 503. In this way, three channels of information are collected simultaneously in the field of view.

In yet another variation on this embodiment, a color separation prism is used to separate the incoming light spectrally to three separate imaging sensors 505. Such color separation prisms are commonly found in so-called three chip color cameras. See, for example, U.S. Pat. No. 4,268, 119.

The positioning of the spectral filter 503 need not be between the printed web 206 and the imaging lens 504. In general, the spectral filter 503 may be interposed anywhere between the illumination source 501 and the imaging sensor 505.

In yet another embodiment of the image scanner 301, the illumination source is a set of red, green and blue LEDs. The printed web 206 is alternately illuminated by the red LEDs, the green LEDs and the blue LEDs. In this way, the spectral filter 503 is in effect combined with the illumination source.

Figure 19:
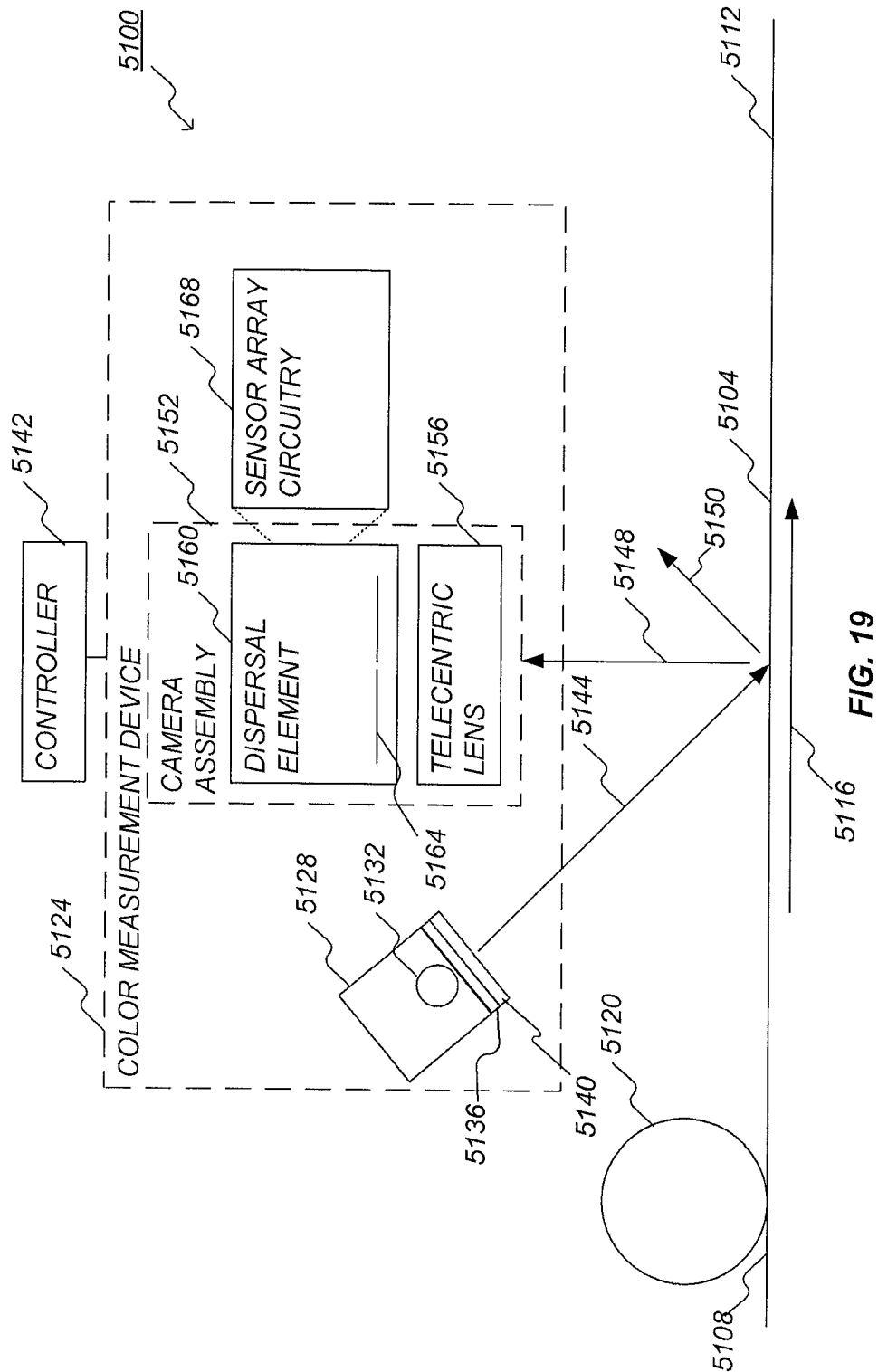
FIG. 19 is a side schematic view of a portion of a printing press.
Figure 20:
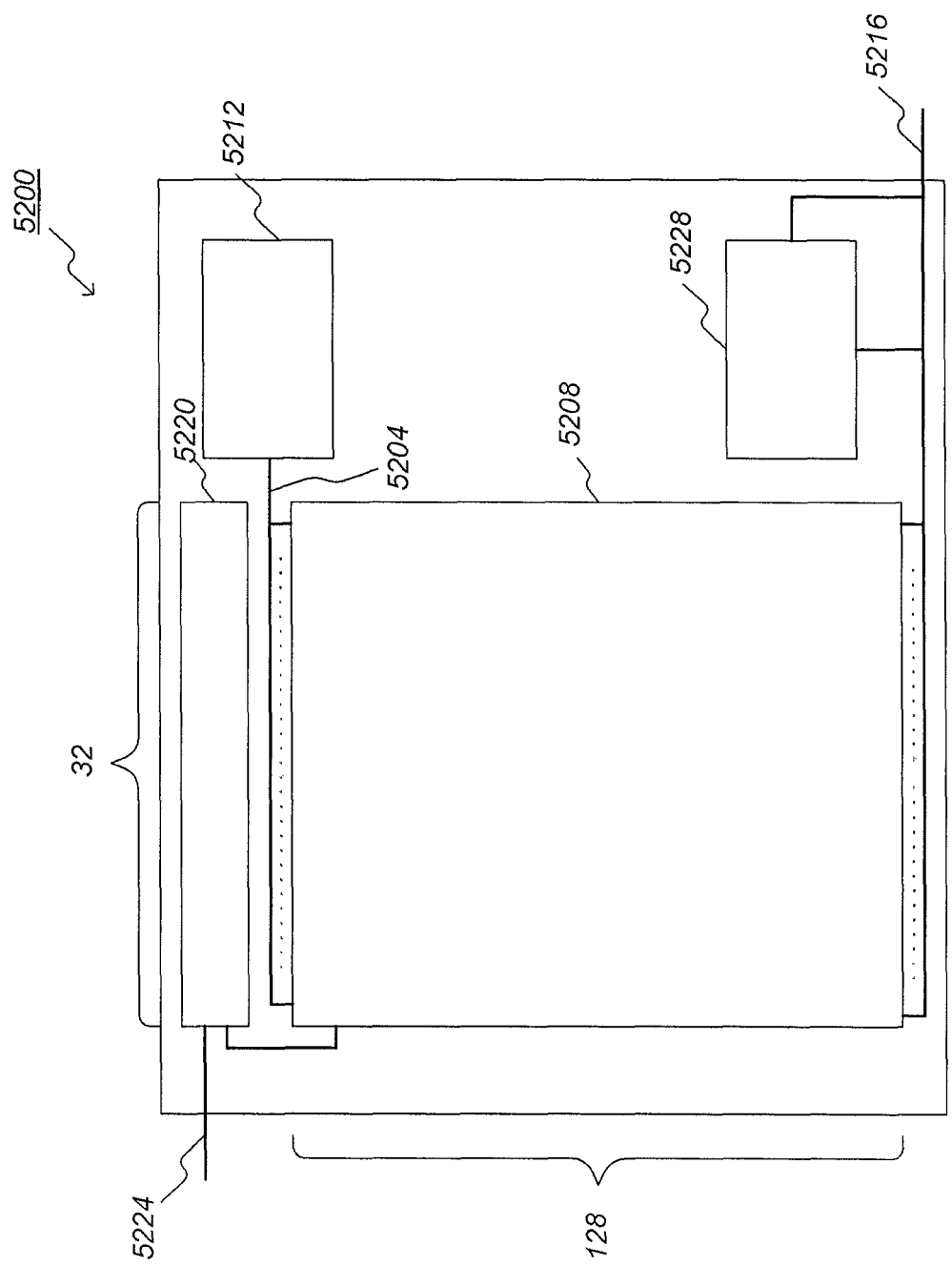
FIG. 20 is a schematic sensor array circuitry system diagram.

FIGS. 19 and 20 illustrate an alternative image capturing system that could be employed in the virtual ink desk 400. Many of the modules and logical structures described are capable of being implemented in software executed by a microprocessor or a similar device or of being implemented in hardware using a variety of components including, for example, application specific integrated circuits ("ASICs"). Terms like "controller" and "processor" may include or refer to both hardware and/or software. Furthermore, throughout the specification capitalized terms are used. Such terms are used to conform to common practices and to help correlate the description with the coding examples and drawings. However, no specific meaning is implied or should be inferred simply due to the use of capitalization. Thus, the claims should not be limited to the specific examples or terminology or to any specific hardware or software implementation or combination of software or hardware.

Embodiments of the invention include a color measurement device configured to detect color printed on a moving web. In one specific embodiment, the invention provides a color measurement device that includes a light source, a light dispersal element, a sensor array, and a processor.

FIG. 19 shows a side schematic view of a portion of a printing press 5100 configured to print an image on a substrate 5104 traveling from an upstream position 5108 to a downstream position 5112 in a direction indicated with arrow 5116. In some embodiments, the substrate 5104 is a moving web. A printing mechanism 5120 prints an image on the substrate 5104 as the substrate 5104 is moving in the direction 5116. The printing press 5100 also includes a color measurement device 5124 that is positioned downstream from the printing mechanism 5120, and above the substrate 5104. The color measurement device 5124 generally measures color values of the image printed on the substrate 5104. In this way, the printing press 5100 can adjust its printing process if necessary.

In the embodiment shown, the color measurement device 5124 includes a light emitting source 5128 positioned at an angle relatively to the substrate 5104 to illuminate the substrate 5104. In some embodiments, the angle is about 45°. The light source 5128 is generally a spectrally known calibrated light source. For example, the light source 5128 is activated to illuminate light onto a white tile for calibration. A portion of the light is reflected and used as default light source values. Other calibration techniques can also be used to calibrate the light source 5128.

In some embodiments, the light source 5128 includes one or more light-emitting-diodes ("LED's") 5132 to emit or generate light, a beam homogenizer or a homogenization lens 5136 to homogenize or to smooth out any irregularities of the emitted light, and a collimating lens 5140 to collimate or parallelize the light before illuminating the substrate 5104. Although the light source 5128 is shown to include an LED, the light source 5128 in other embodiments may have other types of light emitting devices such as but not limited to strobe lights, conventional incandescent bulbs, a halogen bulb, and fluorescent bulbs. Although, as shown in FIG. 20, light emitted from the LED's 5132 is a collimating lens 5140, the light source 5128 can also include a parabolic mirror (not shown) having the LED's 5132 at one of its foci. In this way, light emitted from the LED's 5132 is also collimated. In some embodiments, the light source 5128 is activated at a predetermined frequency. In other embodiments, the light source 5128 can be continuously activated for continuous scanning or monitoring purposes.

After the printing mechanism 5120 has printed on the substrate 5104, the substrate 5104 continues to travel in the direction 5116. As the substrate 5104 arrives below the color measurement device 5124, a controller 5142 activates the light source 5128 to emit light. Although the controller 5142 is shown as external to the color measurement device, the controller 5142 can also be implemented as an internal component of the color measurement device. The light travels through the homogenizing lens 5136 and the collimating lens 5140 to be homogenized and collimated. At least a portion of the light, after being homogenized and collimated, reaches and illuminates the substrate 5104 at a direction indicated by arrow 5144.

Generally, when the emitted light reaches the substrate 5104, the emitted light illuminates one or more line units or pixels that define a line or pixel thickness and a line length. For example, a line unit can have a size of 1 unit or pixel thick and 128 units long for a resolution of 75-200 dots-per-inch. The substrate 5104 subsequently reflects a portion of the emitted light in a direction indicated by arrow 5148 among other reflected directions such as direction indicated by arrow 5150. The direction indicated by arrow 5148 is generally perpendicular to the substrate 5104.

A camera assembly 5152 positioned above the substrate 5104 then receives a portion of the reflected light for further processing. For example, the camera assembly 5152 captures the reflected light and processes it to determine if images printed on the substrate 5104 meet certain printing requirements. If the controller 5142 considers the print images as unacceptable, the controller 5142 will signal different components of the printing press 5100 to make corresponding adjustments. For example, if the controller 5142 determines that images printed on the substrate 5104 project insufficient color intensity, the controller 5142 signals the printing mechanism 5120 to release its blades to allow more ink flow from corresponding ink reservoirs. In other instances, if the controller 5142 determines that images printed on the substrate 5104 are improperly aligned with respect to edges of the substrate 5104, the controller 5142 signals mechanism controlling movements of the substrate 5104 to realign the substrate 5104 accordingly.

In the embodiment shown, the camera assembly 5152 includes a telecentric lens system 5156 to focus the reflected light. The telecentric lens system 5156 can be an objective lens that focuses on images printed on the substrate 5104. In some embodiments, the telecentric lens system 5156 automatically adjusts its focus due to varying distances between the substrate 5104 and the color measurement device 5124 as the substrate 5104 travels. Furthermore, in some embodiments, the telecentric lens system 5156 includes a plurality of positive lenses such that the telecentric lens system 5156 can adjust its focus on the images. In other embodiments, the telecentric lens system 5156 includes only one positive lens.

The camera assembly 5152 also includes a light dispersal system 5160 to receive the focused light arrived from the telecentric lens system 5156 through an aperture or an entrance slit 5164. Exemplary light dispersal systems or dispersal elements 5160 include one or more of a prism, a diffusion lens, and a diffraction grating to spectrally break the focused light. In one particular embodiment, the light dispersal system 5160 includes an ImSpector Spectrograph from SPECIM, which breaks light into a continuous spectrum.

In the embodiment shown, the light dispersal system 5160 spectrally breaks the focused light received through the slit 5164 into a continuous spectrum. Although the light dispersal system 5160 as shown generally breaks the light across a visible light spectrum, the light dispersal system 5160 can also be configured to break the light into a specific predetermined spectrum. In the embodiment shown, the light dispersal system 5160 simultaneously breaks the focused light into a continuous spectrum that is then collected or sensed in 32 spectral bands. In this way, the light dispersal system 5160 makes all light or color spectra available essentially simultaneously at a plurality of outputs.

Once the light dispersal system 5160 has spectrally broken the focused light into a plurality of color spectra, the light dispersal system 5160 projects the spectra onto a sensor array circuitry 5168, detailed hereinafter. In some embodiments, the sensor array 5168 is a semiconductor chip positioned adjacent to the light dispersal system 5160 to receive the spectra. In other embodiments, the light dispersal system 5160 has output pins or output cables (e.g., a fiber optic cable) to connect to the sensor array circuitry 5168. In the embodiment shown, the sensor array circuitry 5168 includes a plurality of sensing elements. Each of the sensing elements corresponds to each of the available spectra. The sensor array circuitry 5168, through each of the sensing elements, essentially simultaneously generates a density value for each of the spectra available. The controller 5142 subsequently determines the colorimetric values of the images on the substrate 5104. In other embodiments, a dedicated processor is embedded within the sensor array circuitry 5168 such that colorimetric values can be efficiently determined, as detailed hereinafter.

FIG. 20 shows an exemplary sensor array circuitry 5168 in the form of a microchip or a chip. As shown, the sensor array circuitry 5168 includes a plurality of complementary metal oxide semiconductor ("CMOS") digital image sensors for sensing the spectrally broken light transmitted from the light dispersal system 5160. In some cases, the sensors have a video-graphic array ("VGA") quality image resolution of about 640 H×480V. As shown, the sensor array circuitry 5168 chip has 32 parallel arrays or channels 5204, and each of the 32 channels has a 128 pixel linear sensor array 5208. The 32 sensor channels have a common clock 5212 and line start inputs 5216. Each of the sensing elements is also coupled to a corresponding buffer 5220 and output line 5224. In some embodiments, the sensor array circuitry 5168 can also include a processor 5228 for processing the sensed signals and determining colorimetric values of the images on the substrate 5104.

In some embodiments, the sensor array circuitry 5168 chip also has multiple input pins. In one particular embodiment, the sensor array circuitry 5168 has an active area dimension of 6.4 mm (or 128 pixels) by 4.8 mm (32 columns/channels). In such a case, the sensor array circuitry 5168 has a pixel size of about 50 µm spacing (6.4 mm/128 pixels), and a column pixel size of about 150 µm spacing (4.8 mm/32 column). The sensor array circuitry 5168 also has a maximum line rate of about (660 inch/second×100 line/inch), or 66,000 lines per second, and a maximum data rate of about (66,000 lines/second×128 pixels), or 8.5 Mega pixels/second. Similarly, the sensor array circuitry 5168 has a minimum saturation output voltage of about 1.5 V full scale, a maximum output noise voltage of 1 mV RMS, a maximum output voltage nonlinearity of about 0.4% full scale, a maximum pixel response nonuniformity of about 7%, a maximum dark signal nonuniformity of about 5%, a peak responsivity of about 20 V/(µj/cm$^2$), and a minimum saturation exposure of about 75 nj/cm$^2$.

The image scanner 301 is not constrained by the embodiments described herein. For example, the image scanner 301 or portions thereof may incorporate aspects of the image sensors described in U.S. Pat. No. 5,724,259, or of various components described in the co-pending patent applications US 2004/0177783, US 2005/0099795, and US 2005/0226466. Said patent and said patent applications are herein fully incorporated by reference.

It is possible that the prepress data may be available at a certain resolution, say 100 DPI, and the image scanner 301 may scan the printed product 206 at another somewhat lower resolution, say 25 DPI. In this case, the color image control system 300 could be successfully utilized, as resolutions as low as 10 DPI have been tested and found to give good color control results. However, resolutions lower than 72 DPI may be objectionable for viewing by users, as text would generally not be legible.

To resolve this issue and allow for situations where the image scanner 302 has resolution of less than 72 DPI, we employ a process called disadumbration. Adumbrate means to give a sketchy outline of. In this case, a reduced resolution scanned image 302 is an adumbration of the full resolution scanned image. Disadumbration is the process of restoring resolution, as much as is possible.

Figure 18:
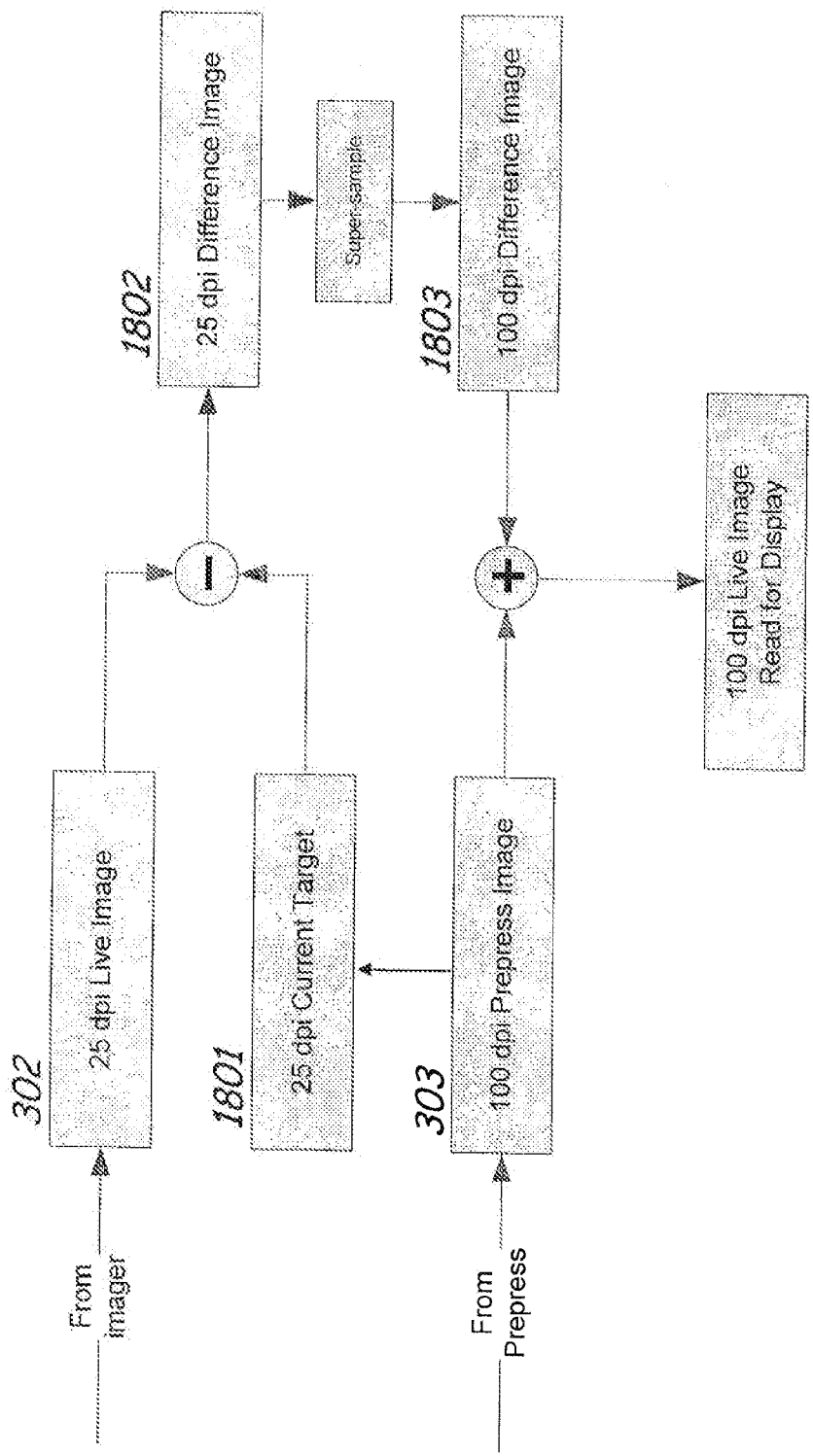
FIG. 18 is a flow chart illustrating one possible disadumbration process.

In one embodiment of disadumbration shown in FIG. 18, the resolution of the target image 303 is reduced to the same resolution as the scanned image 302, so as to produce the reduced resolution target image 1801.

The reduced resolution target image 1801 is then combined with the scanned image 302 to yield a reduced resolution difference image 1802. This image can be supersampled and blurred to the resolution of the target image 303 to give the full resolution difference image 1803. This full resolution difference image 1803 can then be combined with the target image 303 to yield a good quality, representation of the scanned image 302 at an optimal resolution.

Thus, the target image 303, which is at full resolution, will provide sharp detail to the image, and the reduced resolution difference image 1802 will provide the color changes.

Supersampling can be done by simple pixel replication, by an interpolated scheme. Alternately a more sophisticated process may be used that takes the CMYK separation information into account. If, for example, a reduced resolution pixel is calling for an area to be darker, this color change should be apportioned to full resolution pixels where there is coverage that could produce a darker image, and not to non-inked pixels.

Other implementations of disadumbration are possible within the scope of this invention. For example, disadumbration could be performed through the use of deconvolution, or Weiner deconvolution, or Van Cittert deconvolution.

This disadumbration process can be used as described here for display of a scanned image 302. The same technique can be used to display the predicted image 402 at full resolution when only a reduced resolution scanned image 302 is available.

Within the colorbar control system 200, the colorbar measurement system 208 ascertains the color characteristics of various control patches within colorbar 203 portion of the scanned image 302. The color characteristics may be measured on solid single ink patches to yield SID (solid ink density) values. These color characteristics may for example include densitometric measurements or colorimetric measurements.

These colorbar measurements are passed to a SID control system 209, which calculates the adjustments for the adjustable ink control devices so that the control patches will be within a tolerance of a set of target SID values 1201. Such colorbar control systems 200 are well known in the art, as seen in for example, U.S. Pat. Nos. 5,724,259 and 6,142,078, which are fully incorporated herein by reference.

The color image control system 300 receives the scanned image 302 and aligns this image with a target image 303 within the color image processing module 1203 so that pixels corresponding to the same image content may be compared. A subtraction is performed between the corresponding pixels. This difference (i.e., the color error) is then used to create an effective colorbar measurement 1202 to be used by the colorbar control system 200 in place of the actual colorbar measurements.

In order to compute the effective colorbar measurement 1202, the color image processing module 1203 performs linear regression so as to find a set of SID changes that would minimize the color error. A sensitivity matrix 305 is used to estimate the amount of color change that would occur at every pixel in the scanned image 302, if a given change in SID values were to take place as a result of changes in the adjustable ink control devices.

Such color image control systems 300 are well known in the art. See for example U.S. Pat. No. 5,967,050, which is fully incorporated herein by reference.

Alternately, the color characteristics may be measured on control patches other than solid single ink patches, for example, three color gray patches. The results are then translated into effective SID values, and passed to the SID control system 209. Such so-called gray balance control systems are well-known in the art, for example U.S. Pat. No. 4,852,485, which is herein incorporated by reference.

In the embodiments so far described, the color image control system 300 operates to generate target SID values 1201 for a colorbar control system 200. There are several advantages to this approach. One advantage is that the color image control system 300 is dependent on the idiosyncrasies of the particular print device 205. Some presses, for example may deploy a greater or lesser amount of ink than another for a given ink key position. In addition, the effect of a certain opening is dependent upon the coverage for that ink key zone, so the values in the sensitivity matrix 305 will depend upon more than just the CMYK values for that particular pixel.

Another advantage is that this arrangement retrofits well with existing colorbar control systems 200.

Figure 9:
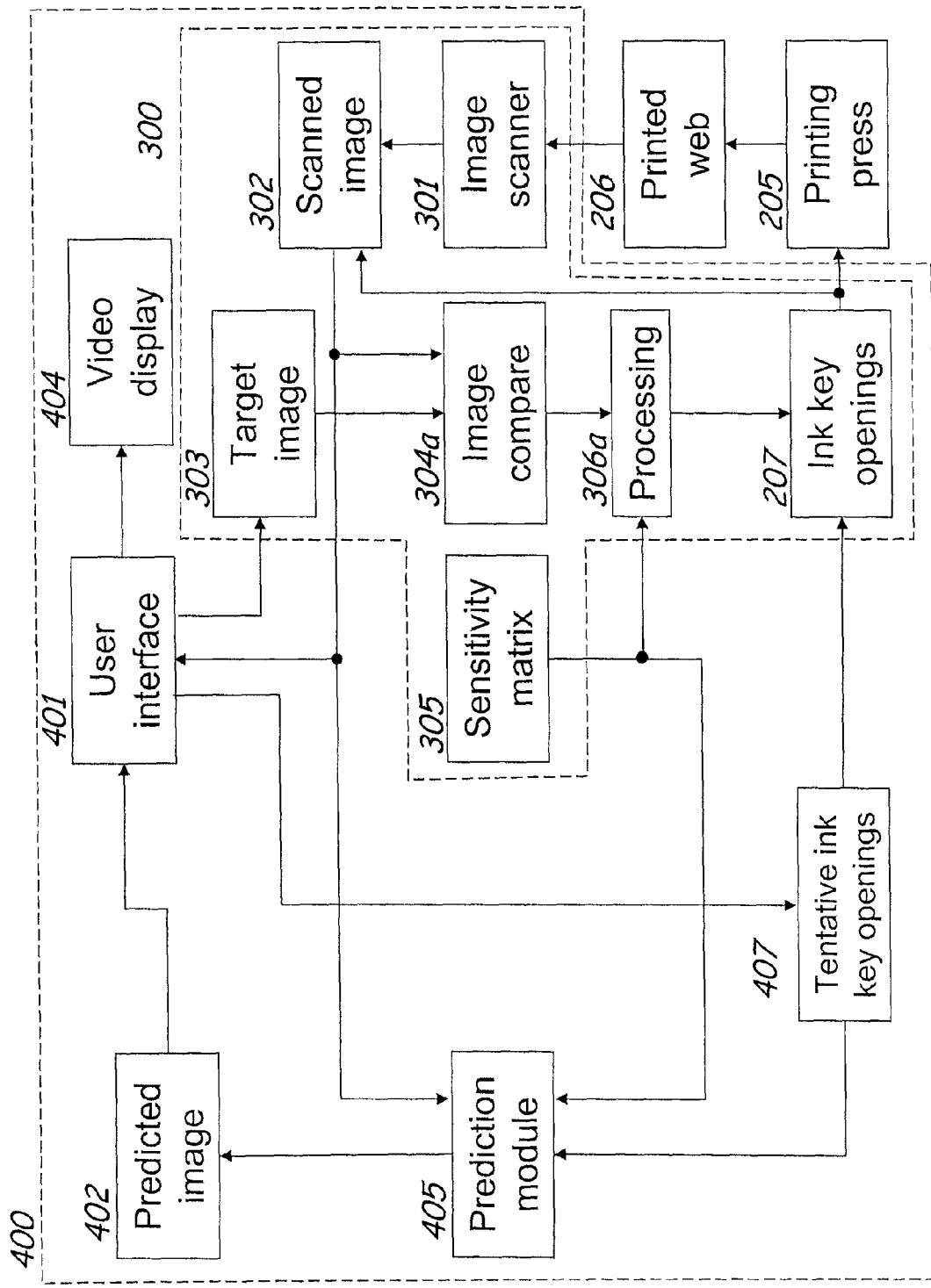
FIG. 9 is a flow chart illustrating operation of a print device including a color control system and a virtual ink desk embodying the invention.

In addition to reducing complication of the color image control system 300, the sensitivity matrix can now be expressed in more universal units, as derivatives of L*, a*, and b* values with respect to densities of cyan, magenta, yellow and black inks The advantages nonetheless, it is possible for the virtual ink desk 400 to be operational with a color image control system 300 which is not used in conjunction with a colorbar control system 200 as illustrated in FIGS. 4 and 9. In this case, the color image control system deals directly in the currency of the print device (e.g. ink key moves) without the intermediate artifice of SID values.

In a practical application of the predictive feature, it is necessary to limit the changes in density ($\Delta_C$, $\Delta_M$, $\Delta_Y$, and $\Delta_K$) to values wherein the actual density is physically attainable. Such a range for black ink, for example, might be between densities of 0.8 D to 2.0 D.

The relationship between density and L*a*b* values represented in the sensitivity matrix 305 is a linear approximation which is valid over a certain range of density. In applications where a greater density range is required, or where greater accuracy is required, multiple sensitivity matrices may be required for different density ranges. Alternately, second order terms may be included.

In yet another embodiment, the entries in the sensitivity matrix 305 are calculated based on the density, rather than being fixed values. In this embodiment, it may be beneficial to compute large changes as a series of smaller changes, recalculating the sensitivity matrix 305 after each small change.

As discussed, the virtual ink desk 400 includes a prediction module 405 that uses the color adjustments made by the user to determine an adjustment to the print device 205 (i.e., an adjustment to the ink control devices or the ink keys). The adjustment will generally have the desired effect in the area of concern; however it may cause other unexpected changes in adjacent areas. Thus, the prediction module generates a predicted image 402 indicative of the printed image 206 from the print device 205 following the implementation of the adjustment. This predicted image 402 can than be reviewed and compared with a desired image to verify that the adjustment produces the desired output.

In a variation of the embodiment illustrated in FIG. 12, when the user selects an ink key zone 103 immediately adjacent ink key zones 103 are also selected, and perhaps the ink key zones immediately adjacent to them. In this way, a multiplicity of adjacent ink key zones 103 will be selected. When an adjustment is made, the full adjustment will be made to the middle of the multiplicity of ink key zones 103. A smaller adjustment will be made to the directly adjacent ink key zones 103, and a still smaller adjustment will be made to the furthest ink key zones 103. This adjustment scheme will mimic the adjustments that press operators normally make.

In another embodiment, the user selects pixels within an image as before. Rather than adjusting (directly or indirectly) the target values for these pixels, the user adjusts the tolerance for that collection of pixels. This is accomplished by modifying the weighting for that collection of pixels in the linear regression. This may be appropriate, for example, when the target image 303 has the proper color values, but other constraints in the image drive these pixels on the printed web 206 to have unacceptable color values. Increasing the weighting for specific pixels will force color differences of those pixels to be given extra consideration in balancing the color differences within an ink key zone 103.

These embodiments of the color adjustment screens 805, 1400, 1500 are meant as examples of how the user may be presented with a screen to effect a color change. Adjustments may be made in colorimetric values or in CMYK density values as illustrated or they may be adjusted in any other suitable color space, such as RGB or HSI. The target pixels to adjust may be within a small contiguous region, may include several disjoint regions throughout the printed sheet, or they may encompass an entire ink key zone 103, an entire page, or the entire printed web 206.

Figure 1:
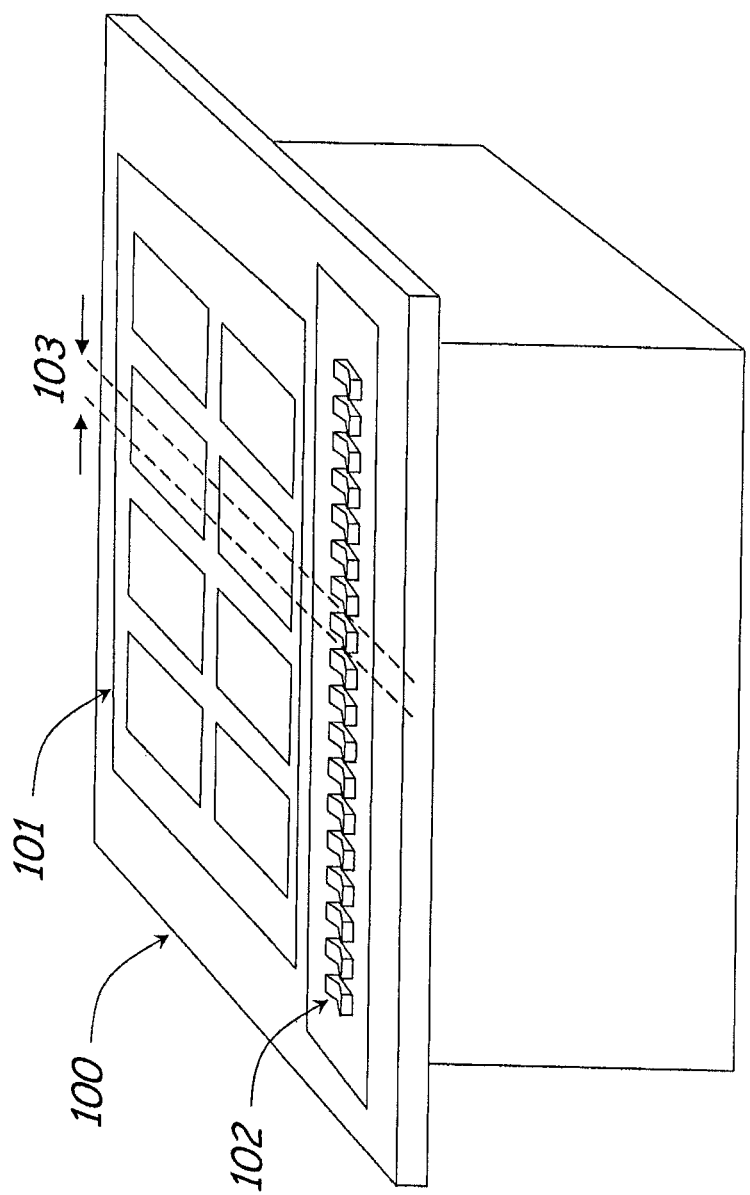
FIG. 1 is a perspective schematic view of a prior art ink desk.

It will be appreciated that an intuitive alignment between an image of the saleable work 204 and the rocker switches 102 as illustrated in FIG. 1 is no longer necessary in this invention. The computer is responsible for determining which ink keys correspond to any given portion of the image. It is no longer necessary for the user to use the rocker switches 102. Since it is no longer necessary for the user to unfold the printed sheet 101, the virtual ink desk 400 will no longer require a flat surface that is the size of an entire impression. Thus, the virtual ink desk is considerably more compact than the traditional ink desk 100.

It is still beneficial to maintain intuitive alignment between the scanned image 302 and the target image 303. This is accomplished when the images are shown in a split screen mode, whereby the images will pan and zoom together.

Note that since the images to be compared are both video display images, i.e. emissive images rather than a mixture of emissive and reflective, the lighting requirements are far less critical.

Figure 16:
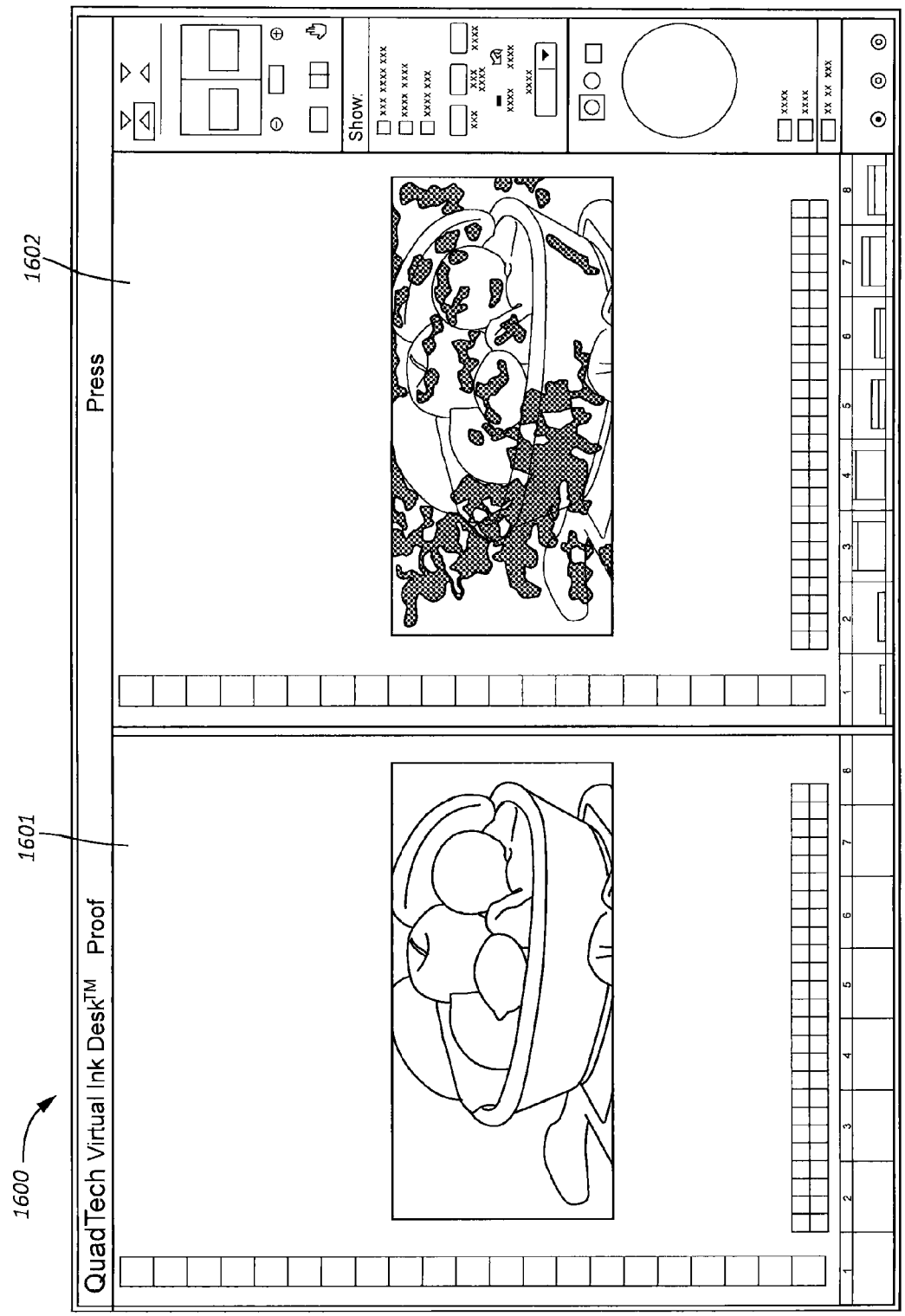
FIG. 16 is a view of another user interface screen of the virtual ink desk of FIG. 4 that shows a blobular inline conflict/color shift tool.
Figure 16A:
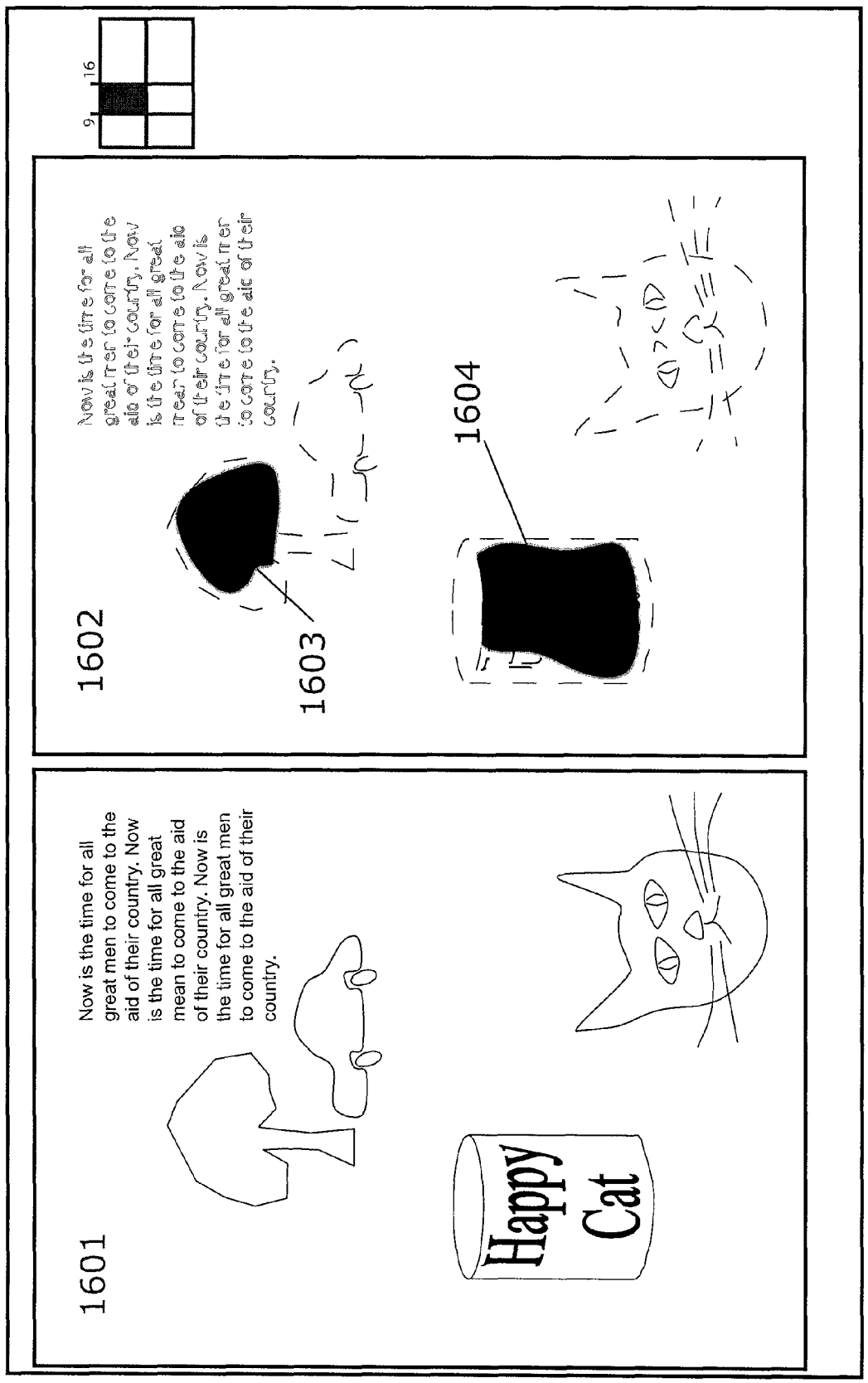
FIG. 16a is a view of another user interface screen of the virtual ink desk of FIG. 4 that shows the blobular inline conflict/color shift tool.

FIG. 16 shows a user interface screen 1600 in which a split screen is employed. FIG. 16a shows an alternate view of the same user interface screen 1600. The left pane of the screen 1601 shows the target image 303 or the scanned image 302, while the right pane shows an enhanced difference 1602 between the proof and the scanned image 302, sometimes referred to as a blobular image. This function is important to press operators and to prepress technicians because it gives them information not previously available—global color shifts in image areas as well as a map of inline conflicts.

The blobular image tool gives the operators spatial information about the color errors so they can understand the location and nature of the problem to take corrective actions. One way of providing context for the errors is to show the scanned image 302 and the error data side by side, as shown in FIG. 16. Another option would be to blend the error image with a ghosted, grayscale version of the target image 303 or scanned image 302. This blending gives more precise information about the location of areas with a significant color difference. FIG. 16 also employs this technique.

In the blobular image, a neutral gray represents no color difference. Any difference from the neutral gray represents an area where the target image 303 does not match the scanned image 302. A colored area represents an error in hue and an area of saturation different from the neutral represents a lightness error.

In the case of an inline conflict, the user can observe that, in a given vertical strip of the image, one area 1603 may have an error in a given direction, for example in the positive a* direction, whereas another area in the same strip 1604 may have an error in the negative a* direction. Depending on the content of the printed materials, theses errors may balance and not result in an ink key move. Thus, without operator input, the errors are not automatically correctable.

To resolve the inline conflict, or other color shift effects, the press operator may choose an important area of the image to emphasize over another. The weightings then result in a different predicted image 402 or a different blobular image representing a new set of compromises, which may be more desirable to the print buyer.

In many cases, after the control system has minimized the color errors, the color differences are relatively small, so they must be amplified and enhanced to give useful information to the user. To accomplish this, a digital curve or lookup table is constructed to emphasize delta ranges while diminishing the importance of others. Either the scanned image 302 or the blobular image should generally be digitally filtered to remove the noise inherent in the printing processes, imaging processes, as well as the alignment and the fine-grained comparison. Operators of the virtual ink desk may also adjust the degree of amplification to help distinguish color differences which require decisions or adjustments verses those which can be considered to be within an acceptable range.

Figure 17:
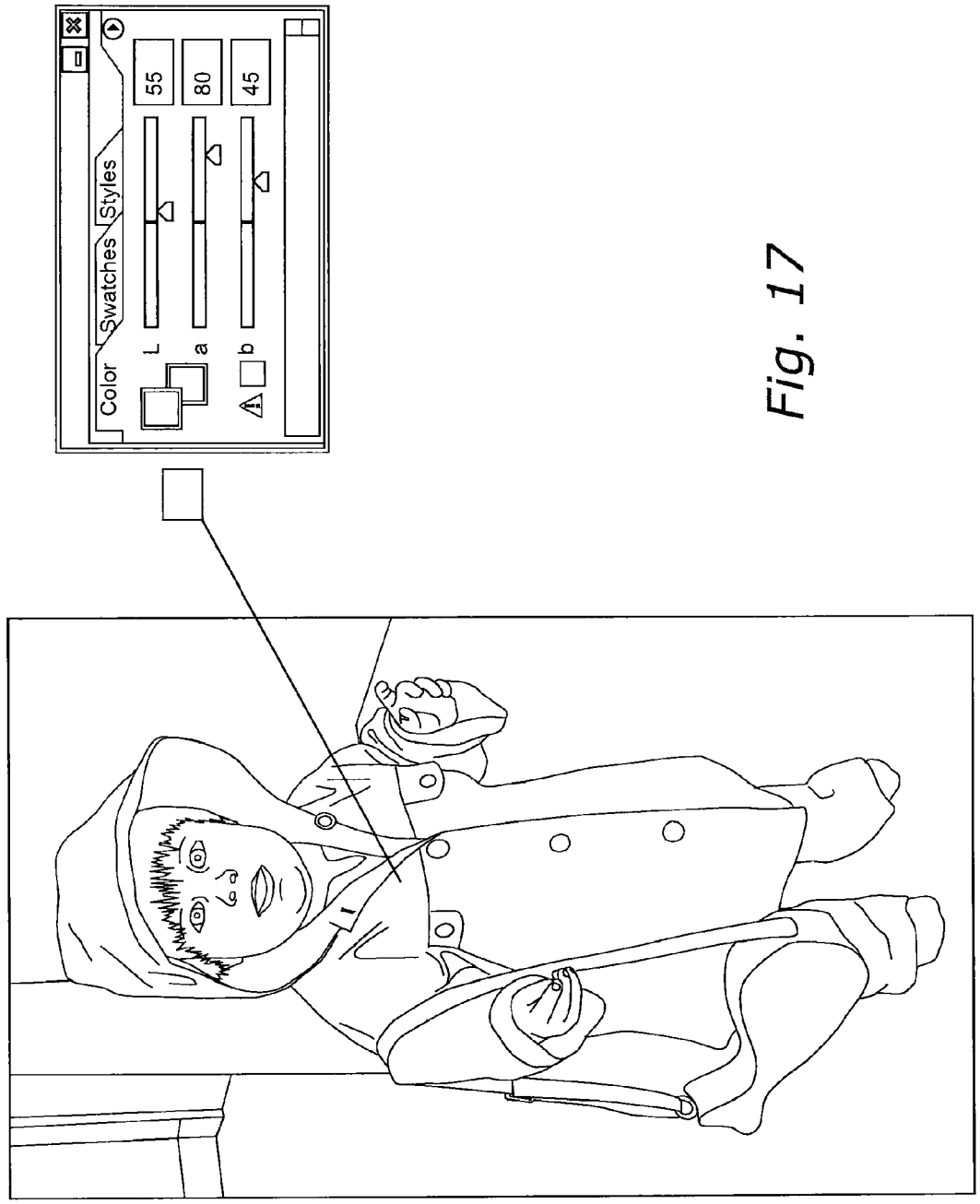
FIG. 17 is a view of another user interface screen of the virtual ink desk of FIG. 4 that shows the selection of a region of interest from a second application such as ADOBE PHOTOSHOP.

Regions of interest for setting weightings, making color corrections, or reporting may be created from within the virtual ink desk and may also come from a variety of external sources, such as is illustrated in FIG. 17. Print buyers and press operators may require real-time and post production reporting of the color conformance of certain areas in printed image. The virtual ink desk may import these regions from auxiliary software tools external to the virtual ink desk, such as a web site, as well as from commercially available tools, such as ADOBE PHOTOSHOP. A number of standard image file formats exists, notably TIFF (Tagged Image File Format) and EPS (Encapsulated Postscript) provide for the specification of regions of interest. The print buyer may provide files in these or other similar formats. These files and their enclosed regions may then be imported into the virtual ink desk and used as regions of interest.

While the term "ink key" applies strictly to an arrangement whereby a screw mechanism actuates the flexure of a blade in order to meter ink, it will be understood that the invention herein applies equally well to control of any ink metering devices, such as the ratchet for the ink ball and segmented ink keys, as well as other ink metering technologies such as ink jet or ultrasonic ink metering.

This invention may be found to be beneficial for the control of any of the operating parameters of the press beyond the adjustment of ink flow. The invention may by advantageously applied to the control of dampening solution, for example. Additionally, color-to-color register may be controlled via the invention, especially with wider webs where fan-out and plate cocking are more critical.

It will be understood that, while this disclosure has been described in terms of web offset presses, the invention may be advantageously applied to other types of printing presses, such as sheet fed presses, flexographic presses or gravure presses.

The abbreviation "CMYK" has been used throughout to generically indicate the set of inks that are used on any particular printing job. Typically, these inks are cyan, magenta, yellow and black inks Depending upon the printing job, some of these inks may be omitted, and other specialty inks may be added. It is to be understood that this invention is not limited to this particular set of printing inks The invention has herein been described as operating in conjunction with a color image control system 300. It will be understood that it could alternately operate in conjunction with a colorbar control system 200. This invention also could be used without a color control system, whereby the press operator is effectively the color control system.

In operation, an approved proof is used to make an initial ink key or ink adjustment mechanism setting. The print device is operated to produce printed product based on these initial ink key settings. The image capturing device captures a color-correct image of the printed product which is transmitted to the virtual ink desk. The virtual ink desk may be located locally (i.e., in the same building or printing facility as the print device) and/or may be located remotely (i.e., in a different facility or city). The captured image is compared to the original proof to determine if the colors match. The virtual ink desk allows for a side-by-side comparison of the proof or target image and the captured image. In addition, the images can be zoomed or panned to allow for a thorough inspection. If any color changes are desired, the user (e.g., press operator and/or remote print buyer, etc.) selects the desired pixels, area, or ink key zones for adjustment. The user than accesses one or more of the variety of user interface screens 1400, 1500 to make the color adjustment. As the color is adjusted or after all of the color adjustments are made, the predictive module calculates the actual ink key adjustments required to achieve the desired color changes. In addition, a predictive image of the printed product is generated. The predictive image is indicative of the printed product following implementation of the calculated ink key moves. If the predictive image is not satisfactory, additional adjustments can be made. Once the image meets the requirements of the user, the ink key settings are transmitted to the print device and printing continues. The predictive image can then be substituted for the target image to allow the color control system 300 to make minor ink key adjustments during printing to assure that the printed product matches the predicted image. Alternatively, another image of the printed product is captured after the ink key adjustments have become fully effective and this image is used as the target image.

Thus, the invention provides, among other things, a new and useful virtual ink desk for use with a print device. The virtual ink desk includes a prediction module that predicts the results of a projected adjustment to the print device to stream line the proofing process at the print device.

What is claimed is:

1. A system comprising:
an image capturing device configured to capture an image of a printed product on a printing press; and
a processing circuit communicably connected to the image capturing device and configured to:
process the captured image into a processed image accurate to within a tolerance in a color space to indicate the visual appearance of one or more colors, wherein the color space is a standardized color space,
transmit the processed image to a display located remote from the image capturing device,
receive an input signal from a remote input device indicating input from the user with respect to the displayed processed image, and
determine whether the user has approved the displayed processed image using the input signal.

2. The system of claim 1, wherein the tolerance is not greater than 4 ΔE of a color on the printed product.

3. The system of claim 1, wherein the tolerance is not greater than 2 ΔE of a color on the printed product.

4. The system of claim 1, wherein the color space is a sRGB or a CIELAB color space.

5. The system of claim 1, wherein the input from the user indicates whether the user has approved or rejected the displayed processed image for printing on the printing press.

6. The system of claim 1, wherein the processed image comprises information from greater than three channels in a visible light spectrum.

7. The system of claim 1, wherein the processing circuit is configured to cause adjustment of at least one ink control device such that an image printed on the printing press substantially matches an approved image.

8. The system of claim 1, wherein the processing circuit is configured to receive an adjustment of at least one color of the processed image from the user via the remote input device.

9. The system of claim 8, wherein the processing circuit is configured to cause adjustment of at least one ink control device based on the adjustment received via the remote input device.

10. The system of claim 1, wherein the display located remote from the image capturing device is calibrated to be accurate to within the tolerance in the standardized color space.

11. A method comprising:
receiving an image of a printed product on a printing press from an image capturing device;
processing the captured image into a processed image accurate to within a tolerance in a color space to indicate the visual appearance of one or more colors, wherein the color space is a standardized color space;
transmitting the processed image to a display located remote from the image capturing device;
receiving an input signal from a remote input device indicating input from the user with respect to the displayed processed image; and
determining whether the user has approved the displayed processed image using the input signal.

12. The method of claim 11, wherein the tolerance is not greater than 4 ΔE of a color on the printed product.

13. The method of claim 11, wherein the color space is a sRGB or a CIELAB color space.

14. The method of claim 11, wherein the input from the user indicates whether the user has approved or rejected the displayed processed image for printing on the printing press.

15. The method of claim 11, wherein the processed image comprises information from greater than three channels in a visible light spectrum.

16. The method of claim 11, further comprising causing adjustment of at least one ink control device such that an image printed on the printing press substantially matches an approved image.

17. The method of claim 11, further comprising receiving an adjustment of at least one color of the processed image from the user via the remote input device.

18. The method of claim 11, further comprising causing adjustment of at least one ink control device based on the adjustment received via the remote input device.

19. A system comprising:
a first computing device configured to receive an image of a printed product captured by an image capturing device, the first computing device comprising:
a processing circuit configured to process the captured image into a processed image accurate to within a tolerance in a color space to indicate the visual appearance of one or more colors, wherein the color space is a standardized color space; and
a communication circuit communicably connected to the processing circuit and configured to:
transmit the processed image to a second computing device remote from the first computing device and the image capturing device, and
receive an input signal from the second computing device indicating input from a user with respect to the displayed processed image;
wherein the processing circuit is further configured to determine whether the user has approved the displayed processed image using the input signal.

20. The system of claim 19, wherein the processing circuit is configured to cause adjustment of at least one ink control device such that an image printed on the print device substantially matches an approved image.

* * * * *